United States Patent
Ogawa

(10) Patent No.: US 11,187,878 B2
(45) Date of Patent: Nov. 30, 2021

(54) ZOOM LENS AND IMAGE PICKUP APPARATUS

(71) Applicant: CANON KABUSHIKI KAISHA, Tokyo (JP)

(72) Inventor: Naotoshi Ogawa, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/987,675

(22) Filed: Aug. 7, 2020

(65) Prior Publication Data

US 2021/0048654 A1    Feb. 18, 2021

(30) Foreign Application Priority Data

Aug. 16, 2019    (JP) .............................. JP2019-149310

(51) Int. Cl.
    *G02B 15/14*    (2006.01)
(52) U.S. Cl.
    CPC .............................. *G02B 15/145125* (2019.08)
(58) Field of Classification Search
    CPC .............................................. G02B 15/145125
    See application file for complete search history.

(56) References Cited

U.S. PATENT DOCUMENTS

| | | | |
|---|---|---|---|
| 9,417,440 B2* | 8/2016 | Sakamoto | G02B 15/145117 |
| 9,648,244 B2* | 5/2017 | Iriyama | G02B 15/17 |
| 10,295,806 B2 | 5/2019 | Miyazawa et al. | |
| 2014/0218808 A1* | 8/2014 | Ogata | G02B 15/173 359/695 |
| 2015/0247997 A1* | 9/2015 | Nagatoshi | G02B 13/16 359/683 |
| 2019/0265447 A1 | 8/2019 | Hori et al. | |
| 2019/0265448 A1 | 8/2019 | Ogawa et al. | |
| 2019/0265451 A1 | 8/2019 | Shimomura et al. | |
| 2020/0158997 A1 | 5/2020 | Hori et al. | |
| 2021/0033833 A1 | 2/2021 | Ogawa | |

FOREIGN PATENT DOCUMENTS

| | | |
|---|---|---|
| JP | 2012-203297 A | 10/2012 |
| JP | 2019-39945 A | 3/2019 |

* cited by examiner

*Primary Examiner* — Darryl J Collins
(74) *Attorney, Agent, or Firm* — Carter, DeLuca & Farrell LLP

(57) ABSTRACT

Provided is a zoom lens including, in order from an object side to an image side: a front lens unit having a positive refractive power and configured not to move for zooming; one or two intermediate lens units having a negative refractive power as a whole and configured to move for zooming; a first rear lens unit having a negative refractive power and configured to move for zooming; a second rear lens unit having a positive refractive power and configured to move for zooming; and a third rear lens unit having a positive refractive power and configured not to move for zooming. In the zoom lens, all intervals between adjacent lens units are changed for zooming, and focal lengths of the front lens unit, the one or two intermediate lens units, the first rear lens unit, and the zoom lens at a telephoto end are appropriately set.

11 Claims, 15 Drawing Sheets

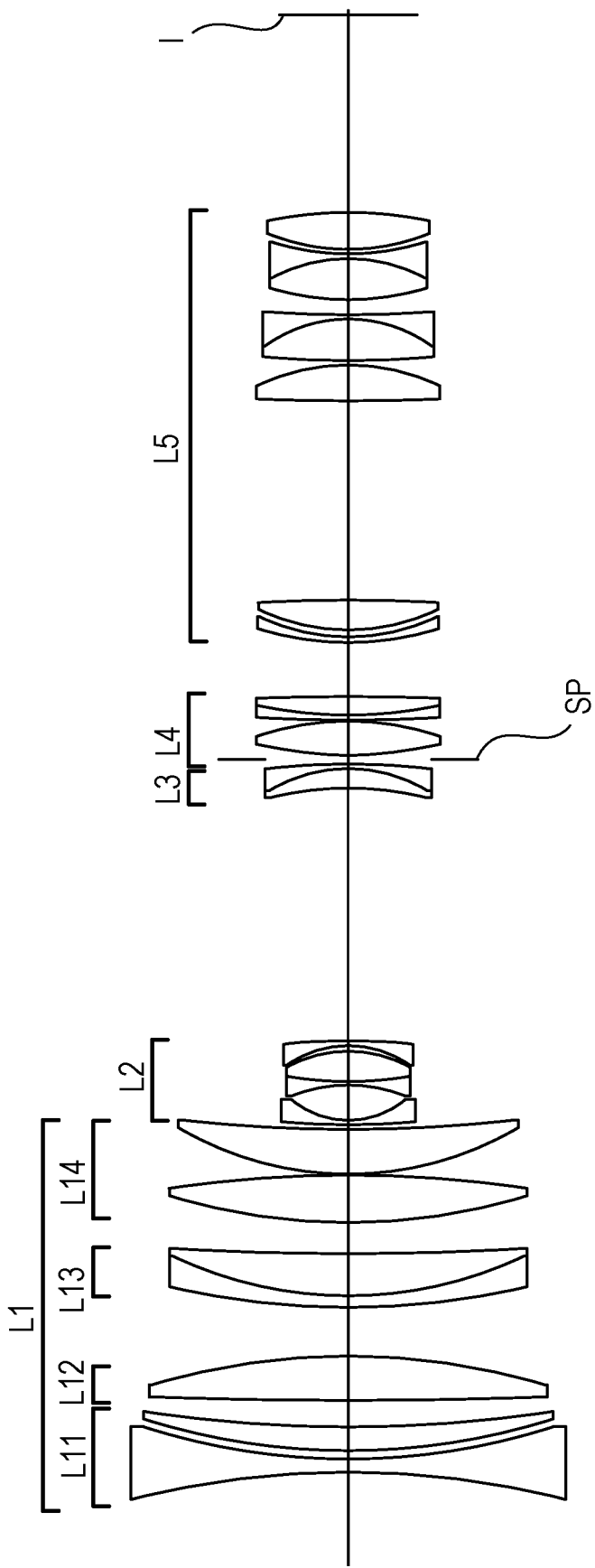

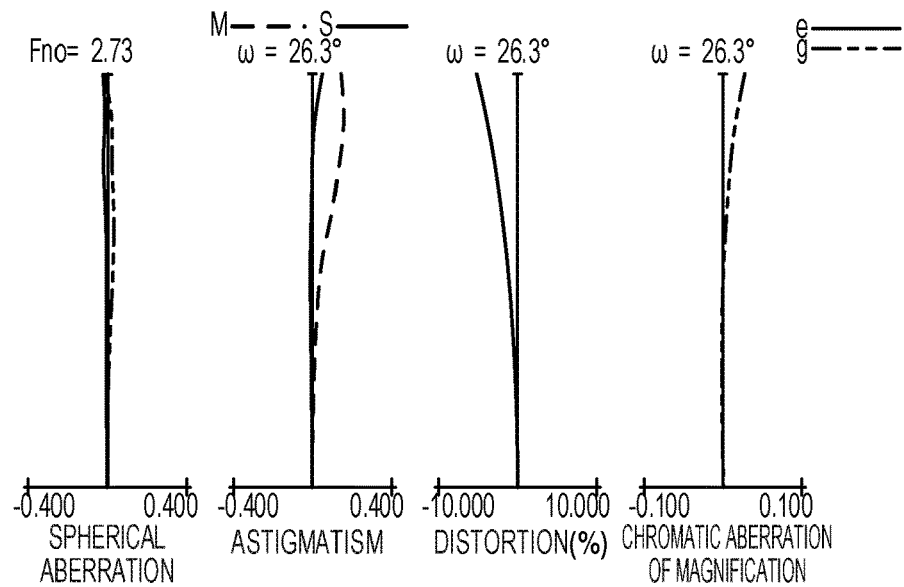
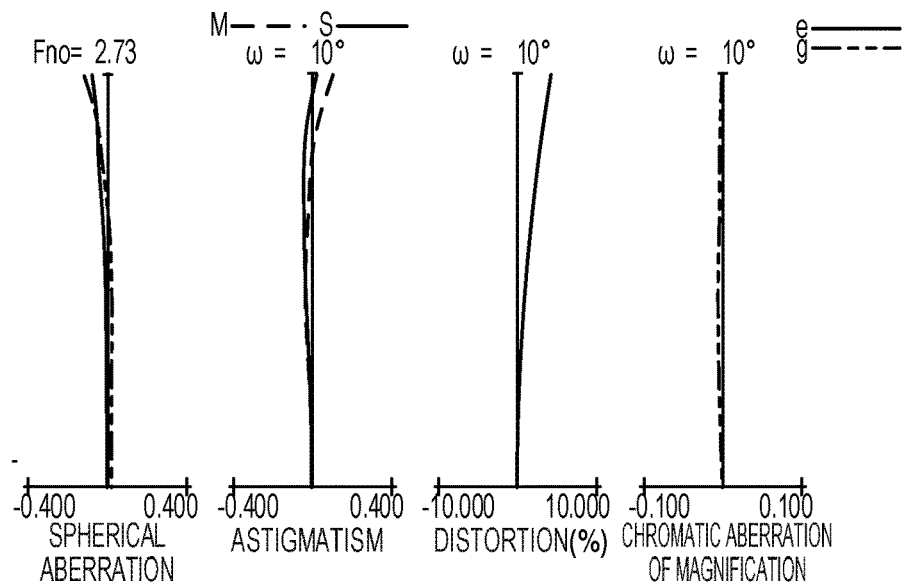
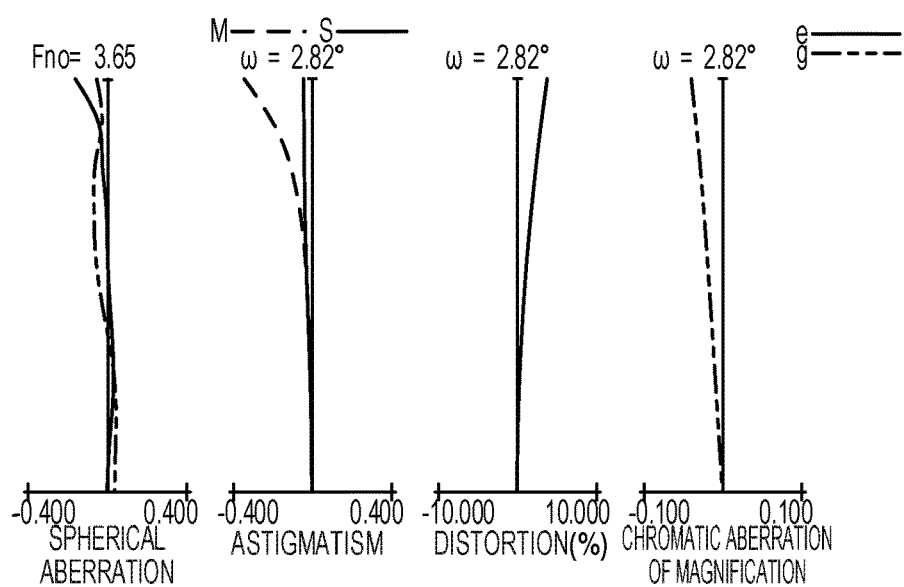

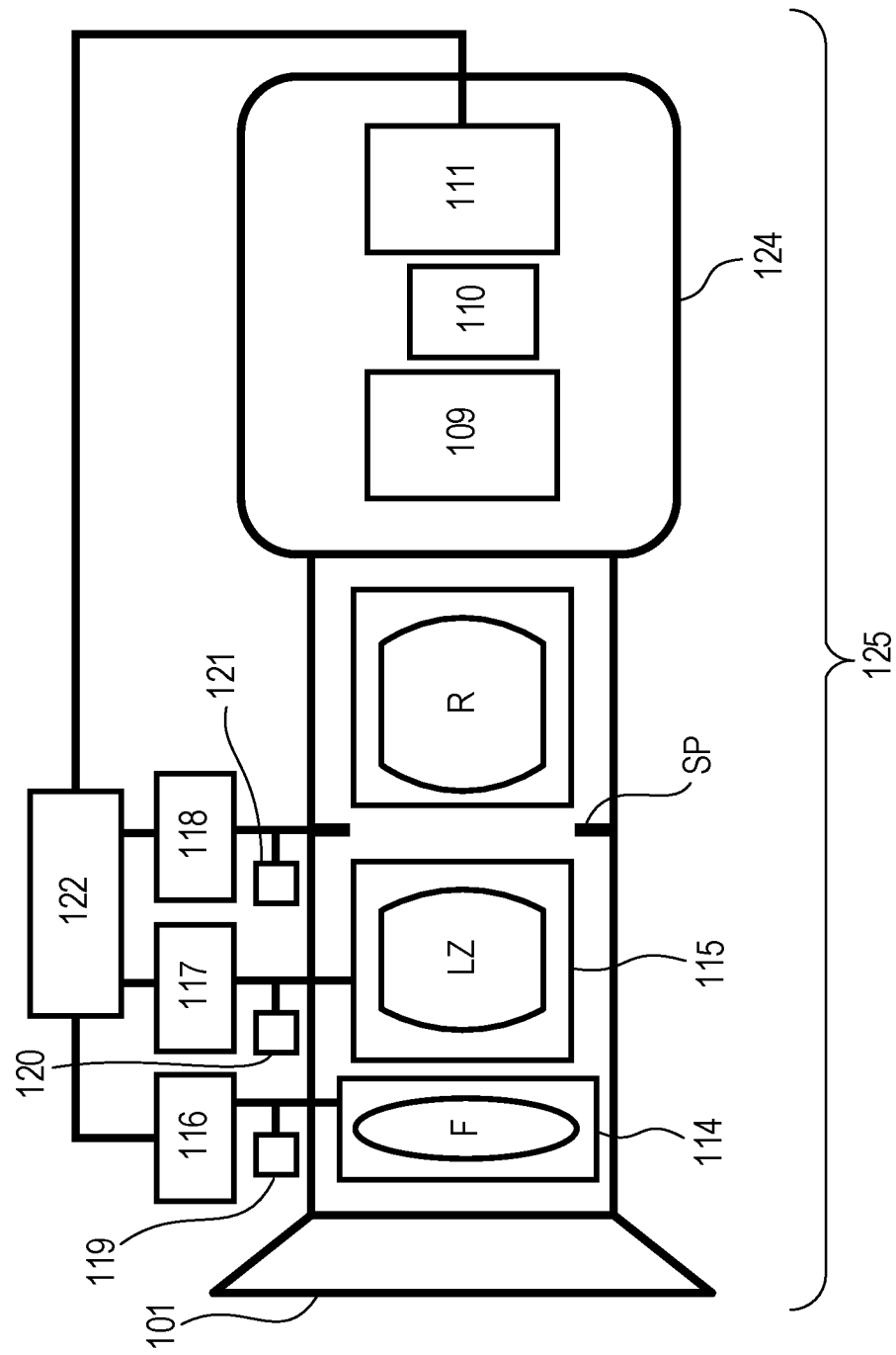

ZOOM LENS AND IMAGE PICKUP APPARATUS

BACKGROUND OF THE INVENTION

Field of the Invention

The present invention relates to a zoom lens and an image pickup apparatus.

Description of the Related Art

In photography for, for example, sports broadcasting or a TV program about nature, an object is often photographed at a distant location, and thus a telephoto zoom lens having a high zoom ratio and a long focal length at a telephoto end is appropriate for such photography. In addition, due to increase in number of pixels of an image pickup element, there is a demand for increase in performance of a telephoto zoom lens, in particular, optical performance over an entire zoom range and an entire focus range. Further, for use in photographing modes in which great importance is placed on portability and operability, it is common to use a zoom lens in which a first lens unit having a positive refractive power, which is used for focusing, is arranged closest to an object side.

As a compact and lightweight zoom lens having a high magnification and high performance, there is known a zoom lens consisting of, in order from an object side, a first lens unit having a positive refractive power, a second lens unit having a negative refractive power, a third lens unit having a negative refractive power, and a fourth lens unit having a positive refractive power, in which the second lens unit and the third lens unit are configured to move during zooming (Japanese Patent Application Laid-Open No. 2012-203297 and Japanese Patent Application Laid-Open No. 2019-39945).

In the zoom lens disclosed in Japanese Patent Application Laid-Open No. 2019-39945, the second lens unit having the negative refractive power, the third lens unit having the negative refractive power, and the fourth lens unit having the positive refractive power are configured to move during zooming to achieve the high magnification and the high performance while the zoom lens is compact and lightweight.

However, the zoom lens disclosed in Japanese Patent Application Laid-Open No. 2019-39945 has a configuration that is optimal for a camera including a relatively small image pickup device for a television camera, and has a problem of being upsized when applied to a camera including a large-format image pickup device.

SUMMARY OF THE INVENTION

An aspect of embodiments provides, for example, a zoom lens beneficial in high magnification, small size and light weight, and high optical performance.

An aspect of embodiments provides a zoom lens consisting of, in order from an object side to an image side: a front lens unit having a positive refractive power and configured not to move for zooming; one or two intermediate lens units having a negative refractive power as a whole and configured to move for zooming; a first rear lens unit having a negative refractive power and configured to move for zooming; a second rear lens unit having a positive refractive power and configured to move for zooming; and a third rear lens unit having a positive refractive power, configured not to move for zooming, in which all intervals between adjacent lens units are changed for zooming, and in which following conditional expressions are satisfied:

$$-6 \leq f1/f2 \leq -2.5;$$

$$2.8 \leq ft/f1 \leq 5.0; \text{ and}$$

$$3.5 \leq f3/f2 \leq 12.0,$$

where f1 represents a focal length of the front lens unit, f2 represents a focal length of the one or two intermediate lens units, f3 represents a focal length of the first rear lens unit, and ft represents a focal length of the zoom lens at a telephoto end.

Further features of the present invention will become apparent from the following description of exemplary embodiments with reference to the attached drawings.

BRIEF DESCRIPTION OF THE DRAWINGS

FIG. 5 is a cross-sectional view of Embodiment 3 of the present invention when focused at infinity at a wide-angle end.

FIG. 10A shows aberration diagrams of Embodiment 5 when focused at infinity at the wide-angle end.

FIG. 10B shows aberration diagrams of Embodiment 5 when focused at infinity at a focal length of 84 mm.

FIG. 10C shows aberration diagrams of Embodiment 5 when focused at infinity at a telephoto end.

FIG. 15 is a schematic diagram for illustrating a main part of an image pickup apparatus according to at least one embodiment of the present invention.

DESCRIPTION OF THE EMBODIMENTS

Figure 1:
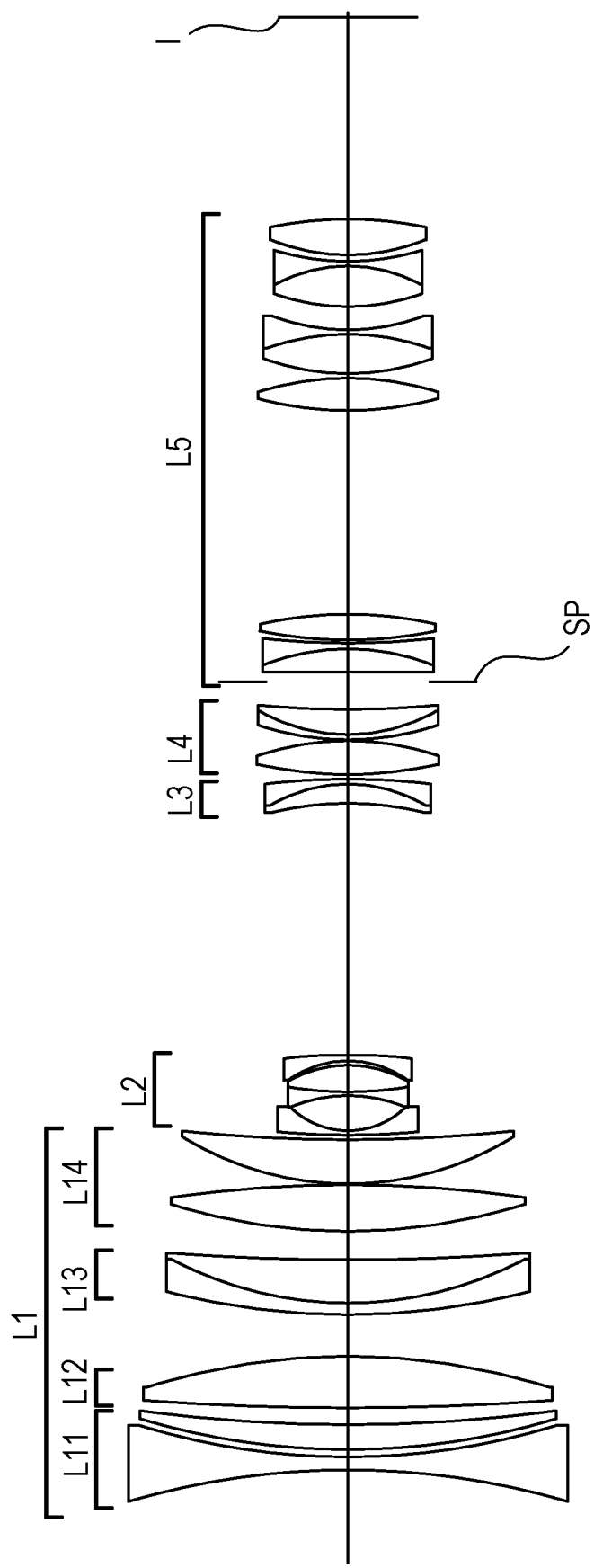
FIG. 1 is a cross-sectional view of Embodiment 1 of the present invention when focused at infinity at a wide-angle end.

A zoom lens according to at least one embodiment of the present invention consists of, in order from an object side to an image side: a front lens unit having a positive refractive power, which is configured not to move for zooming; an intermediate lens unit consisting of one or two lens units and having a negative refractive power as a whole, which is configured to move for zooming; a first rear lens unit having a negative refractive power, which is configured to move for zooming; a second rear lens unit having a positive refractive power, which is configured to move for zooming; and a third rear lens unit having a positive refractive power, which is configured not to move for zooming. In the zoom lens, an interval between each pair of adjacent lens units is changed for zooming. When focusing on an object at close distance, the entire front lens unit or a part of the front lens unit is configured to move on an optical axis.

The following conditional expressions are satisfied:

$$-6.0 \leq f1/f2 \leq -2.5 \quad (1);$$

$$2.8 \leq ft/f1 \leq 5.0 \quad (2); \text{ and}$$

$$3.5 \leq f3/f2 \leq 12.0 \quad (3),$$

where f1 represents a focal length of the front lens unit, f2 represents a focal length of the intermediate lens unit, f3 represents a focal length of the first rear lens unit, and "ft" represents a focal length of an entire system of the zoom lens at a telephoto end.

Next, a technical meaning of this configuration is described.

The conditional expression (1) is intended to define a condition for suppressing variations in various aberrations caused by zooming with a compact and lightweight zoom lens while achieving a high magnification. When the ratio exceeds the upper limit of the conditional expression (1), the focal length of the intermediate lens unit becomes relatively much longer. As a result, a movement amount of the intermediate lens unit is increased, and the zoom lens is disadvantageously upsized. In contrast, when the ratio falls below the lower limit of the conditional expression (1), the focal length of the intermediate lens unit becomes relatively much shorter. As a result, it becomes difficult to suppress the variations in various aberrations caused by zooming.

It is more preferred to set the conditional expression (1) as follows.

$$-5.5 \leq f1/f2 \leq -3.5 \quad (1a)$$

The conditional expression (2) is intended to define a condition for suppressing various aberrations at the telephoto end while the zoom lens is compact and lightweight. When the ratio exceeds the upper limit of the conditional expression (2), the focal length of the front lens unit becomes relatively much shorter. As a result, a magnification of aberrations generated in the front lens unit becomes larger, and hence it becomes difficult to suppress the various aberrations at the telephoto end. In contrast, when the ratio falls below the lower limit of the conditional expression (2), the focal length of the front lens unit becomes relatively much longer. As a result, an extension amount during focusing is increased, and the zoom lens is disadvantageously upsized.

It is more preferred to set the conditional expression (2) as follows.

$$2.8 \leq ft/f1 \leq 4.0 \quad (2a)$$

The conditional expression (3) is intended to define a condition for suppressing the variations in various aberrations caused by zooming with a compact and lightweight zoom lens while achieving a high magnification. When the ratio exceeds the upper limit of the conditional expression (3), the focal length of the intermediate lens unit becomes relatively much shorter, and hence it becomes difficult to suppress the variations in various aberrations caused by zooming. In contrast, when the ratio falls below the lower limit of the conditional expression (3), the focal length of the intermediate lens unit becomes relatively much longer. As a result, the movement amount of the intermediate lens unit is increased, and the zoom lens is disadvantageously upsized.

It is more preferred to set the conditional expression (3) as follows.

$$3.5 \leq f3/f2 \leq 10.0 \quad (3a)$$

Further, in the present invention, it is preferred to satisfy the following conditional expression:

$$1.0 < fA/fw < 3.0, \quad (4)$$

where fA represents a focal length of the second rear lens unit, and fw represents a focal length of the entire system of the zoom lens at a wide-angle end.

The conditional expression (4) is intended to define a condition for achieving a compact third rear lens unit and suppressing the variations in various aberrations caused by zooming. When the ratio exceeds the upper limit of the conditional expression (4), the focal length of the second rear lens unit becomes relatively much longer. As a result, a height of an axial ray at the third rear lens unit becomes larger, and the third rear lens unit is disadvantageously upsized. In contrast, when the ratio falls below the lower limit of the conditional expression (4), the focal length of the second rear lens unit becomes relatively much shorter. As a result, refractive powers of the lenses forming the second rear lens unit become stronger, and hence it becomes difficult to suppress the various aberrations. Alternatively, the number of lenses forming the second rear lens unit is increased, and hence the second rear lens unit is disadvantageously upsized.

It is more preferred to set the conditional expression (4) as follows.

$$1.5 < fA/fw < 2.5 \quad (4a)$$

Further, in the present invention, it is preferred to satisfy the following conditional expression.

$$-4.0 < fA/f2 < -1.5 \quad (5)$$

The conditional expression (5) is intended to define a condition for achieving a compact third rear lens unit and suppressing the variations in various aberrations caused by zooming. When the ratio exceeds the upper limit of the conditional expression (5), the focal length of the second rear lens unit becomes relatively much longer. As a result, the height of the axial ray at the third rear lens unit becomes larger, and the third rear lens unit is disadvantageously upsized. In contrast, when the ratio falls below the lower limit of the conditional expression (5), the focal length of the second rear lens unit becomes relatively much shorter. As a result, the refractive powers of the lenses forming the second rear lens unit become stronger, and hence it becomes difficult to suppress the various aberrations. Alternatively, the number of lenses forming the second rear lens unit is increased, and hence the second rear lens unit is disadvantageously upsized.

It is more preferred to set the conditional expression (5) as follows.

$$-3.5 < fA/f2 < -1.5 \tag{5a}$$

Further, in the present invention, it is preferred to satisfy the following conditional expression:

$$0.7 < fA1/fA < 1.5 \tag{6},$$

where fA1 represents a focal length of a lens closest to the object side in the second rear lens unit.

The conditional expression (6) is intended to define a condition for achieving a high magnification and suppressing the variations in various aberrations caused by zooming. When the ratio exceeds the upper limit of the conditional expression (6), a distance between principal points of the third rear lens unit and the second rear lens unit at the telephoto end becomes larger, and hence it becomes difficult to achieve the high magnification. In contrast, when the ratio falls below the lower limit of the conditional expression (6), the refractive power of the lens closest to the object side in the second rear lens unit becomes much stronger, and hence it becomes difficult to suppress the variations in various aberrations caused by zooming.

It is more preferred to set the conditional expression (6) as follows.

$$0.9 < fA1/fA < 1.3 \tag{6a}$$

Further, in the present invention, the intermediate lens unit includes a lens having a negative refractive power and a lens having a positive refractive power, and it is preferred to satisfy the following conditional expression:

$$-0.003 < (\theta 2n - \theta 2p)/(\nu 2n - \nu 2p) < -0.0015 \tag{7},$$

where ν2p represents an average value of an Abbe number of the positive lens of the intermediate lens unit, θ2p represents an average value of a partial dispersion ratio of the positive lens of the intermediate lens unit, ν2n represents an average value of an Abbe number of the negative lens of the intermediate lens unit, and θ2n represents an average value of a partial dispersion ratio of the negative lens of the intermediate lens unit.

Note that, an Abbe number "νd" and a partial dispersion ratio θgF are expressed by the following expressions:

$$\nu d = (Nd-1)/(NF-NC); \text{ and}$$

$$\theta gF = (Ng-NF)/(NF-NC),$$

where Ng, NF, Nd, and NC represent refractive indices with respect to a g-line (wavelength: 435.8 nm), an F-line (wavelength: 486.1 nm), a d-line (wavelength: 587.6 nm), and a C-line (wavelength: 656.3 nm) of Fraunhofer lines, respectively.

The conditional expression (7) is intended to define a condition for suppressing a variation in chromatic aberration of magnification caused by zooming, and axial chromatic aberration at the telephoto end. When the ratio exceeds the upper limit of the conditional expression (7), it becomes difficult to correct a second-order spectrum at the telephoto end. In contrast, when the ratio falls below the lower limit of the conditional expression (7), it becomes difficult to suppress the variation in chromatic aberration of magnification caused by zooming.

It is more preferred to set the conditional expression (7) as follows.

$$-0.0025 < (\theta 2n - \theta 2p)/(\nu 2n - \nu 2p) < -0.0017 \tag{7a}$$

Further, in the present invention, it is preferred to satisfy the following conditional expression:

$$1.0 < f21/f2 < 2.0 \tag{8},$$

where f21 represents a focal length of a lens closest to the object side in the intermediate lens unit.

The conditional expression (8) is intended to define a condition for achieving a compact zoom lens and suppressing the variations in various aberrations caused by zooming. When the ratio exceeds the upper limit of the conditional expression (8), a distance between principal points of the front lens unit and the intermediate lens unit at the wide-angle end becomes larger, and hence it becomes difficult to achieve the compact zoom lens. In contrast, when the ratio falls below the lower limit of the conditional expression (8), the refractive power of the lens closest to the object side in the intermediate lens unit becomes much stronger, and hence it becomes difficult to suppress the variations in various aberrations caused by zooming.

It is more preferred to set the conditional expression (8) as follows.

$$1.1 < f21/f2 < 1.5 \tag{8a}$$

Further, in the present invention, the first rear lens unit includes a lens having a negative refractive power and a lens having a positive refractive power. It is preferred to satisfy the following conditional expression:

$$1.5 < \nu 3n/\nu 3p < 3.0 \tag{9},$$

where ν3p represents an average value of an Abbe number of the positive lens of the first rear lens unit, and ν3n represents an average value of an Abbe number of the negative lens of the first rear lens unit.

The conditional expression (9) is intended to define a condition for suppressing a variation in axial chromatic aberration caused by zooming, and the variations in various aberrations caused by zooming. When the ratio exceeds the upper limit of the conditional expression (9), refractive powers of lenses of the first rear lens unit become much weaker, and it becomes difficult to suppress the variations in various aberrations caused by zooming. Alternatively, it becomes difficult to suppress chromatic aberration in the first rear lens unit, and hence it becomes difficult to suppress the variation in axial chromatic aberration caused by zooming, in particular. In contrast, when the ratio falls below the lower limit of the conditional expression (9), refractive powers of lenses of the first rear lens unit become much stronger, and it becomes difficult to suppress the variations in various aberrations caused by zooming. Alternatively, it becomes difficult to suppress chromatic aberration in the first rear lens unit, and hence it becomes difficult to suppress the variation in axial chromatic aberration caused by zooming, in particular.

Embodiment 1

A zoom lens according to Embodiment 1 of the present invention is specifically described with reference to FIG. 1, FIG. 2A, FIG. 2B, and FIG. 2C.

Figure 2A:
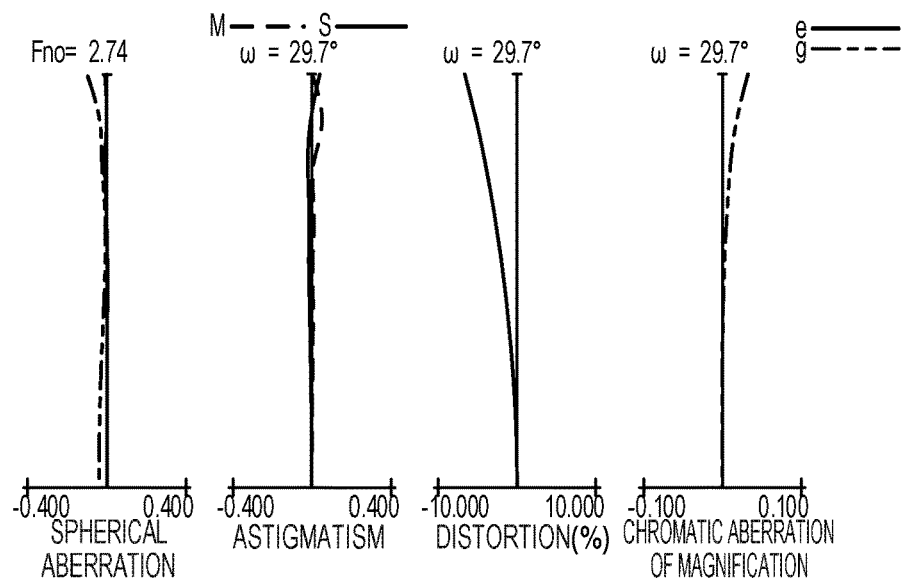
FIG. 2A shows aberration diagrams of Embodiment 1 when focused at infinity at the wide-angle end.
Figure 2B:
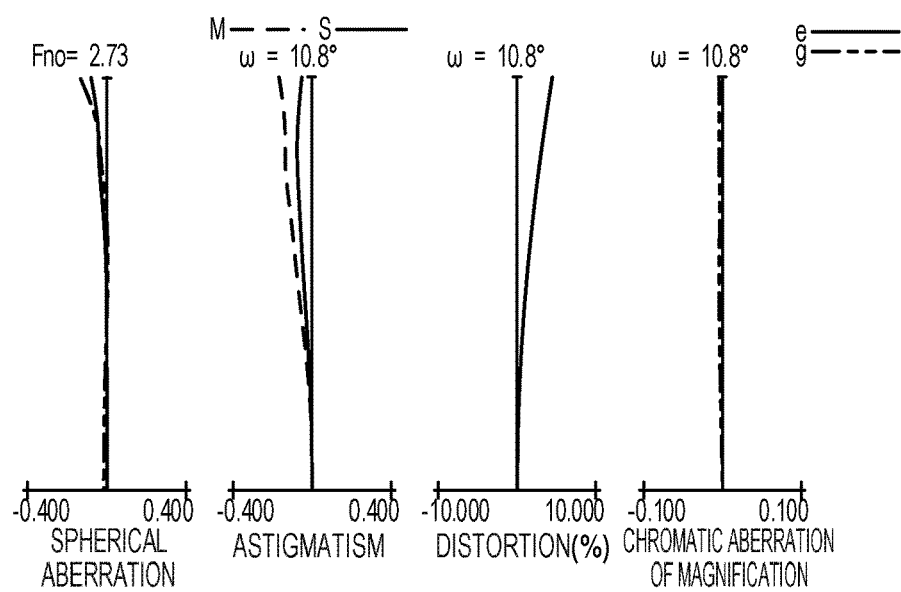
FIG. 2B shows aberration diagrams of Embodiment 1 when focused at infinity at a focal length of 77 mm.
Figure 2C:
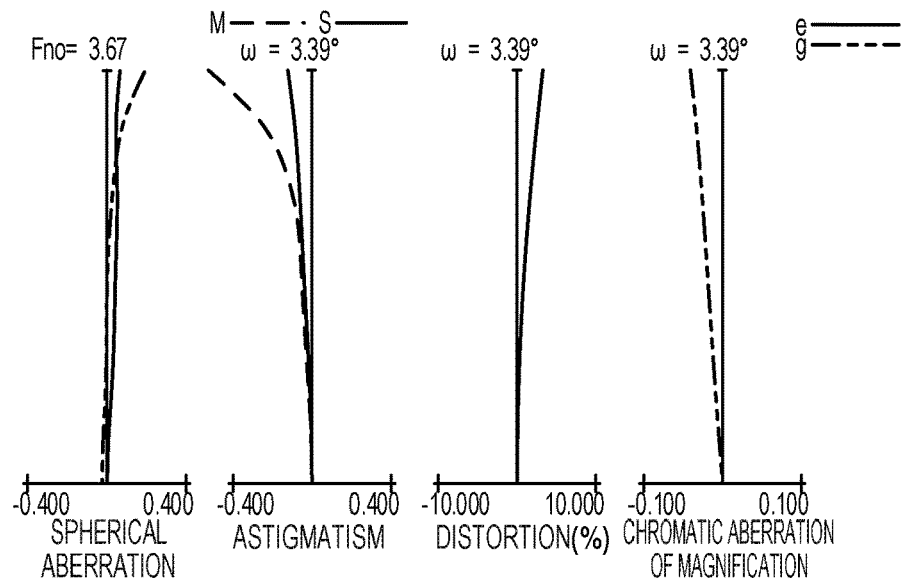
FIG. 2C shows aberration diagrams of Embodiment 1 when focused at infinity at a telephoto end.
Figure 3:
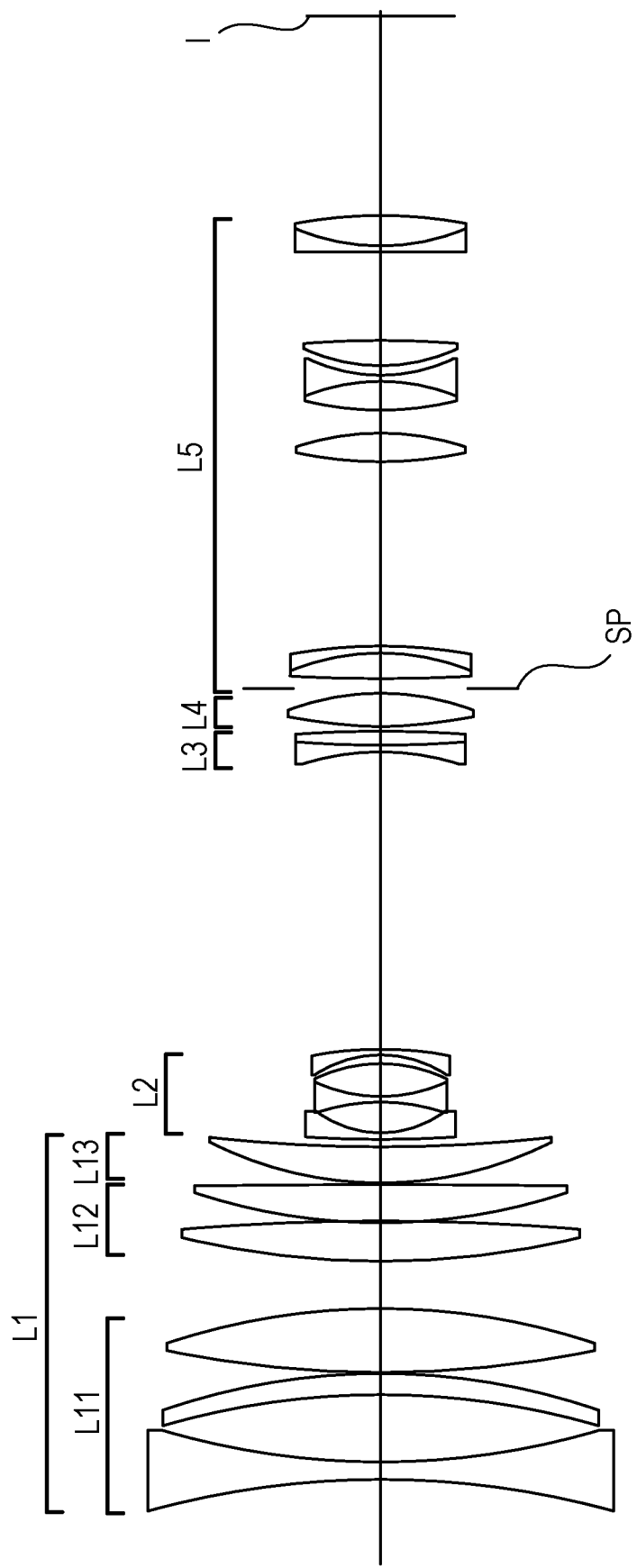
FIG. 3 is a cross-sectional view of Embodiment 2 of the present invention when focused at infinity at a wide-angle end.
Figure 4A:
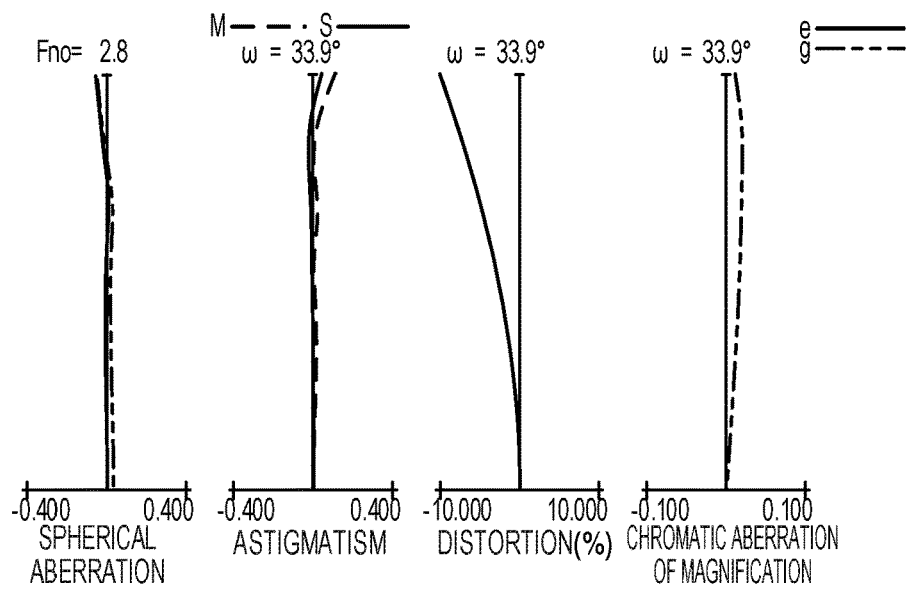
FIG. 4A shows aberration diagrams of Embodiment 2 when focused at infinity at the wide-angle end.
Figure 4B:
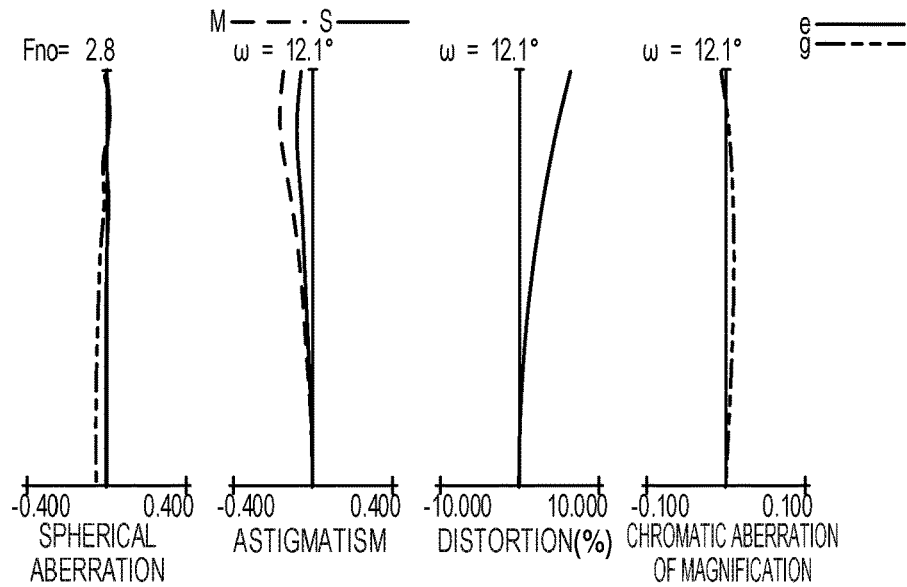
FIG. 4B shows aberration diagrams of Embodiment 2 when focused at infinity at a focal length of 69 mm.
Figure 4C:
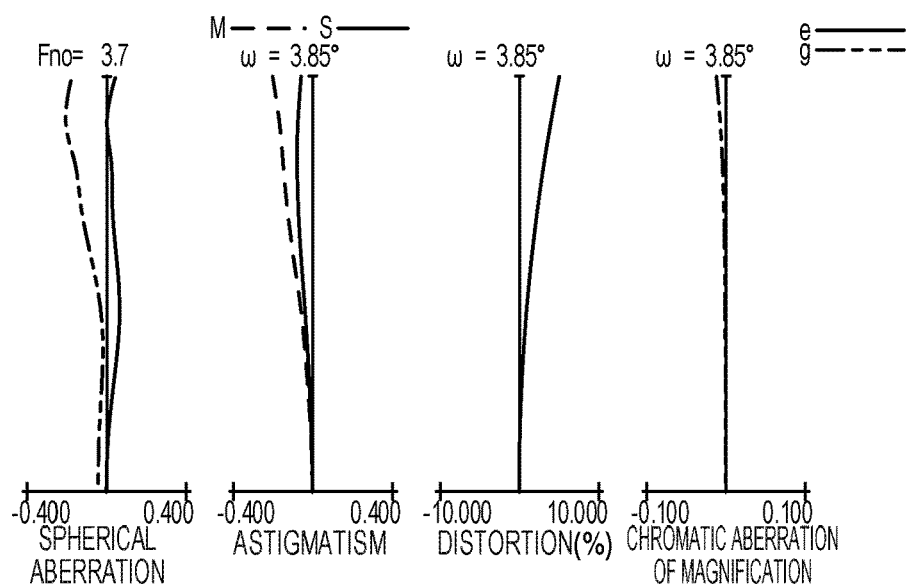
FIG. 4C shows aberration diagrams of Embodiment 2 when focused at infinity at a telephoto end.
Figure 6A:
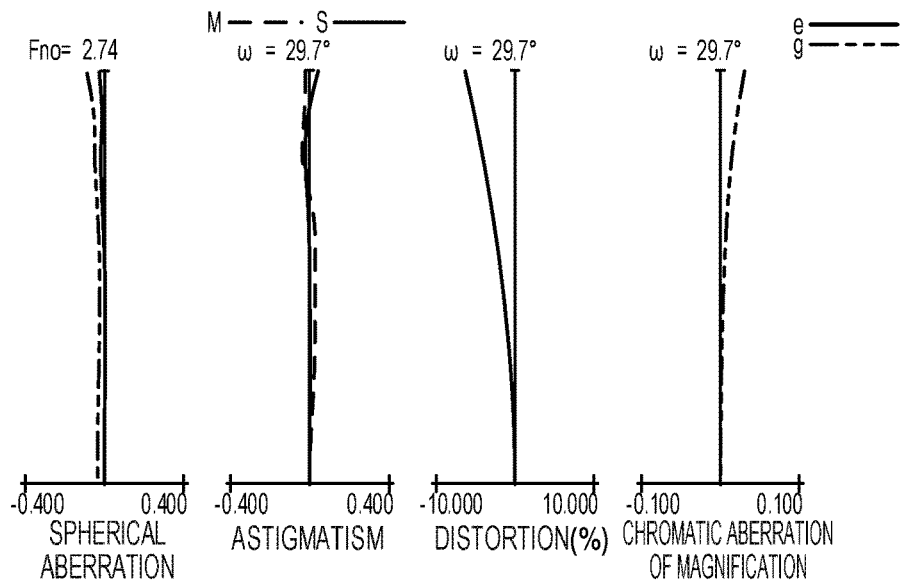
FIG. 6A shows aberration diagrams of Embodiment 3 when focused at infinity at the wide-angle end.
Figure 6B:
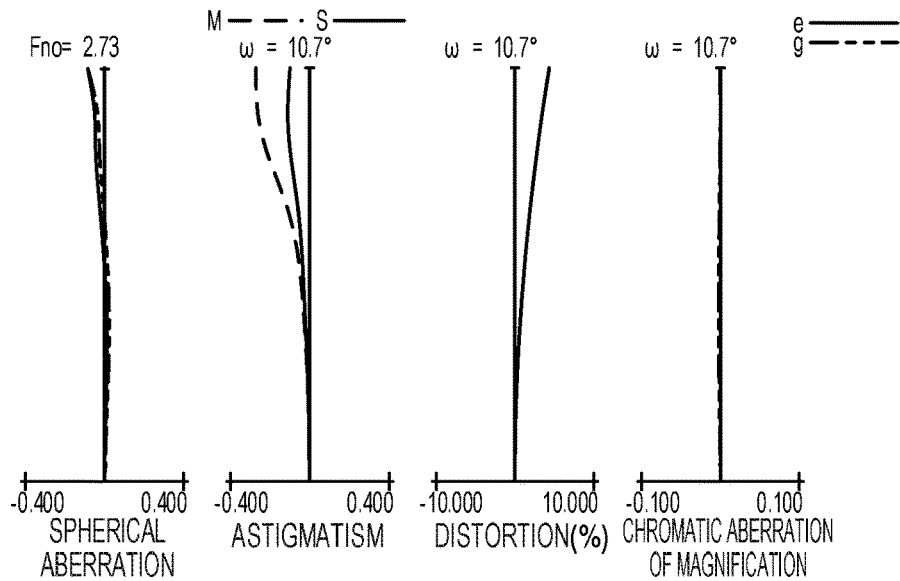
FIG. 6B shows aberration diagrams of Embodiment 3 when focused at infinity at a focal length of 78 mm.
Figure 6C:
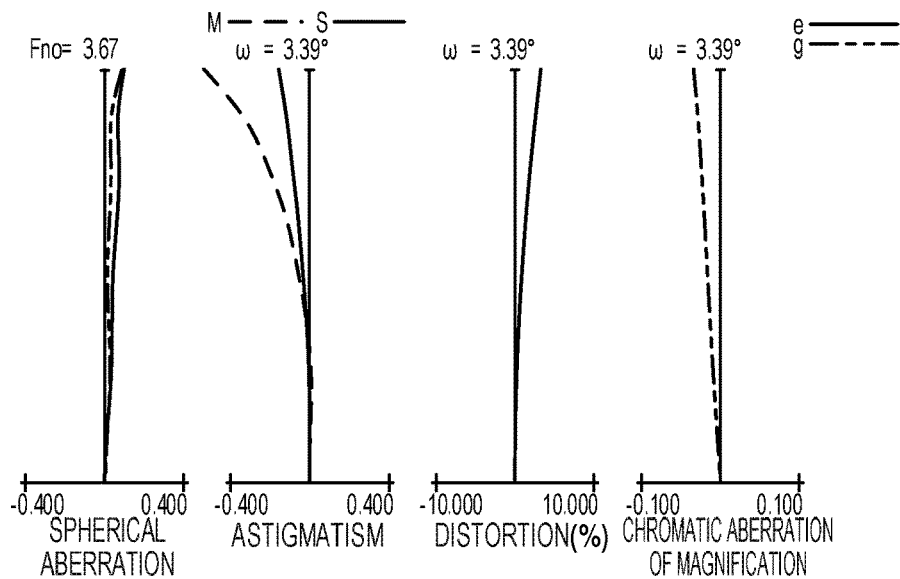
FIG. 6C shows aberration diagrams of Embodiment 3 when focused at infinity at a telephoto end.
Figure 7:
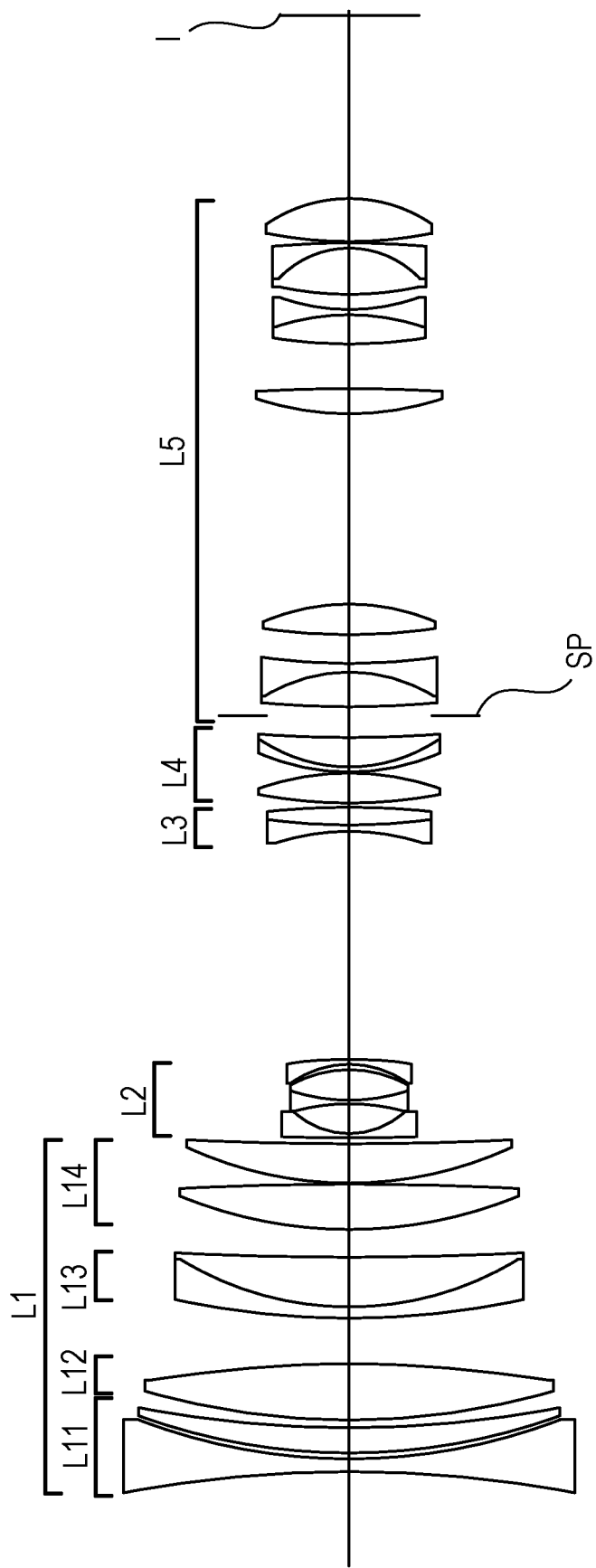
FIG. 7 is a cross-sectional view of Embodiment 4 of the present invention when focused at infinity at a wide-angle end.
Figure 8A:
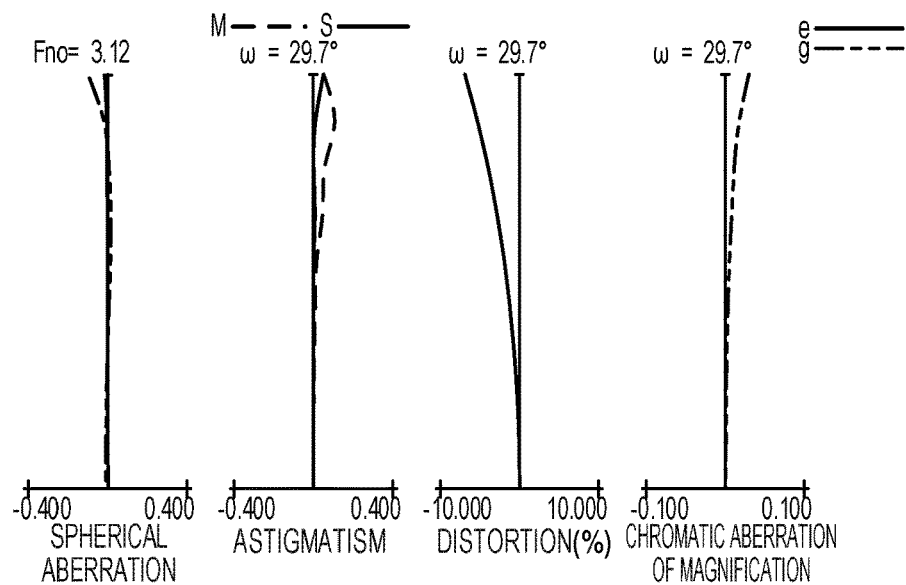
FIG. 8A shows aberration diagrams of Embodiment 4 when focused at infinity at the wide-angle end.
Figure 8B:
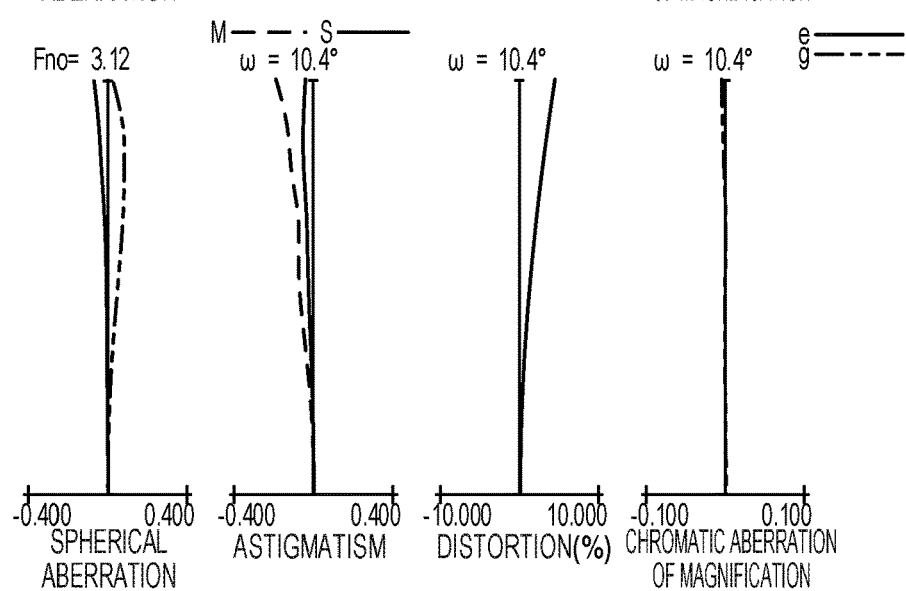
FIG. 8B shows aberration diagrams of Embodiment 4 when focused at infinity at a focal length of 81 mm.
Figure 8C:
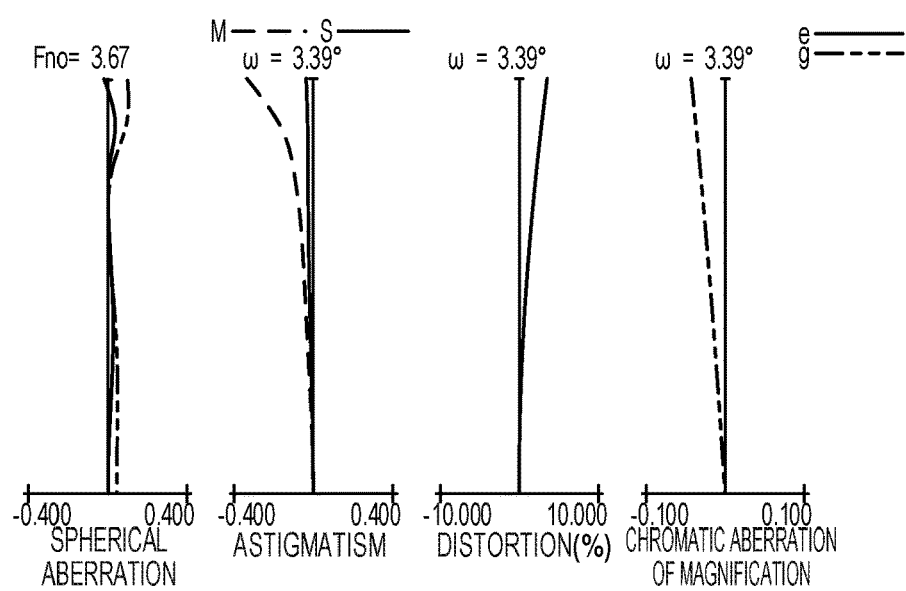
FIG. 8C shows aberration diagrams of Embodiment 4 when focused at infinity at a telephoto end.
Figure 9:
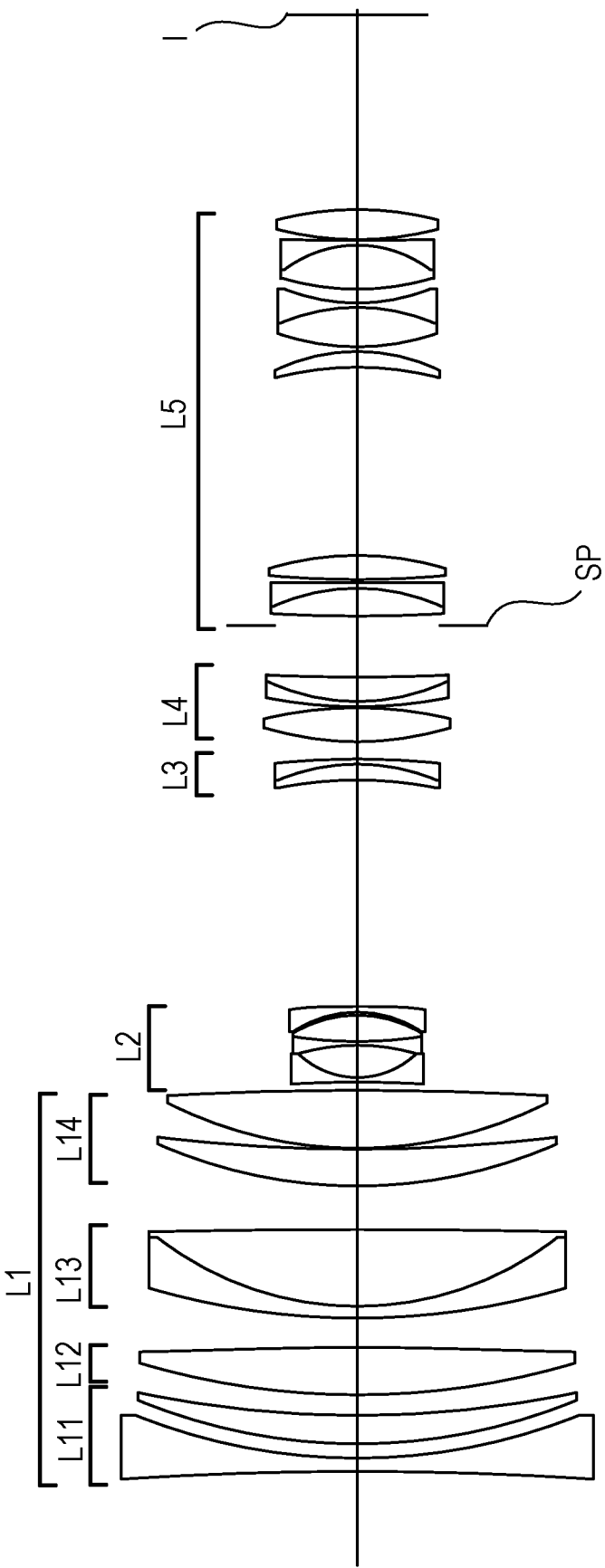
FIG. 9 is a cross-sectional view of Embodiment 5 of the present invention when focused at infinity at a wide-angle end.
Figure 11:
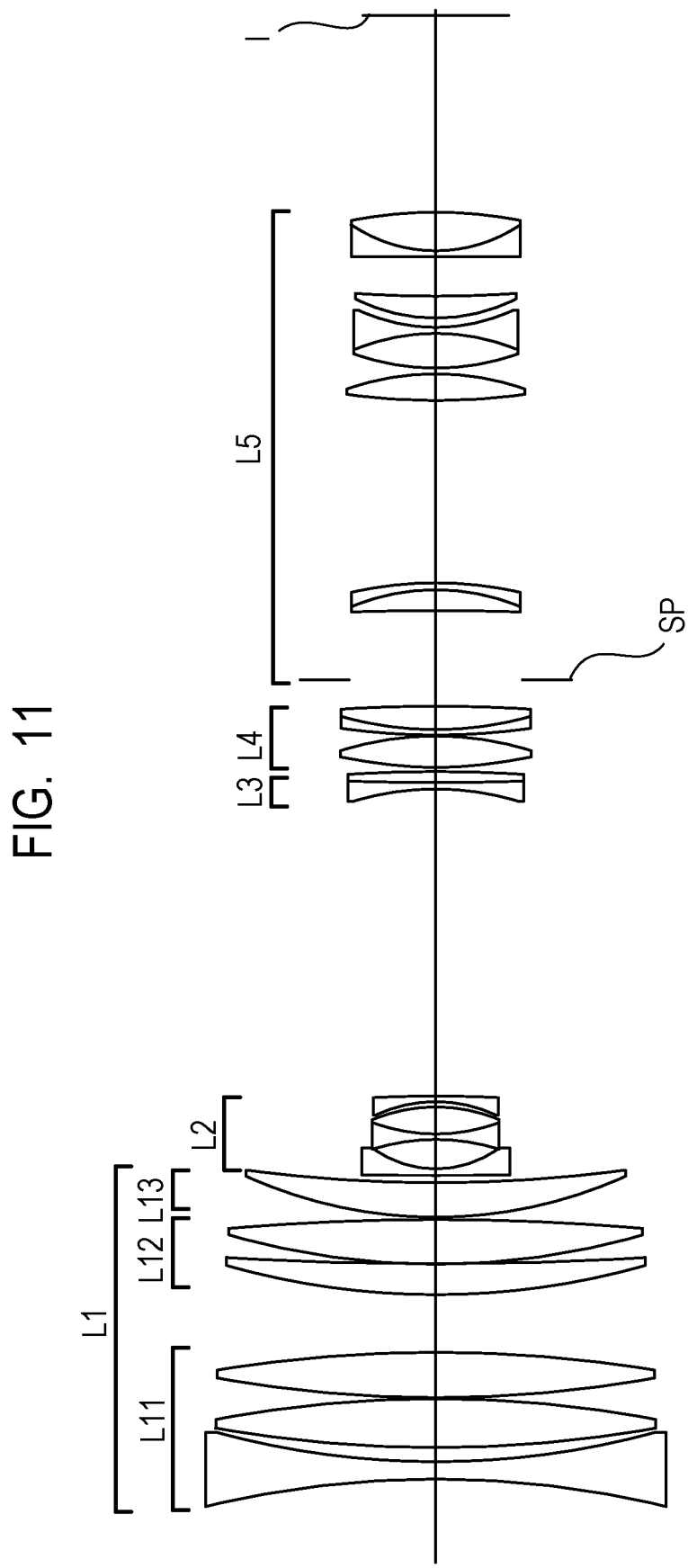
FIG. 11 is a cross-sectional view of Embodiment 6 of the present invention when focused at infinity at a wide-angle end.
Figure 12A:
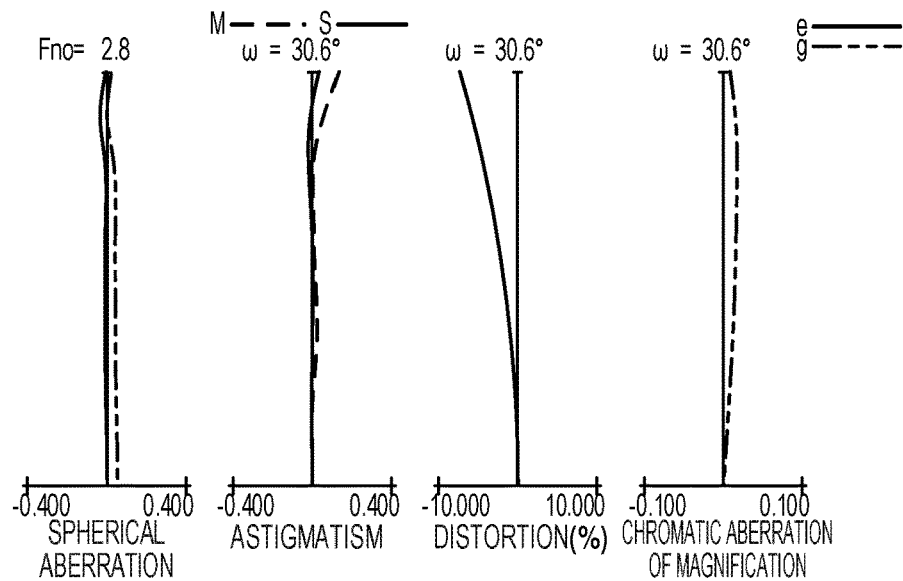
FIG. 12A shows aberration diagrams of Embodiment 6 when focused at infinity at the wide-angle end.
Figure 12B:
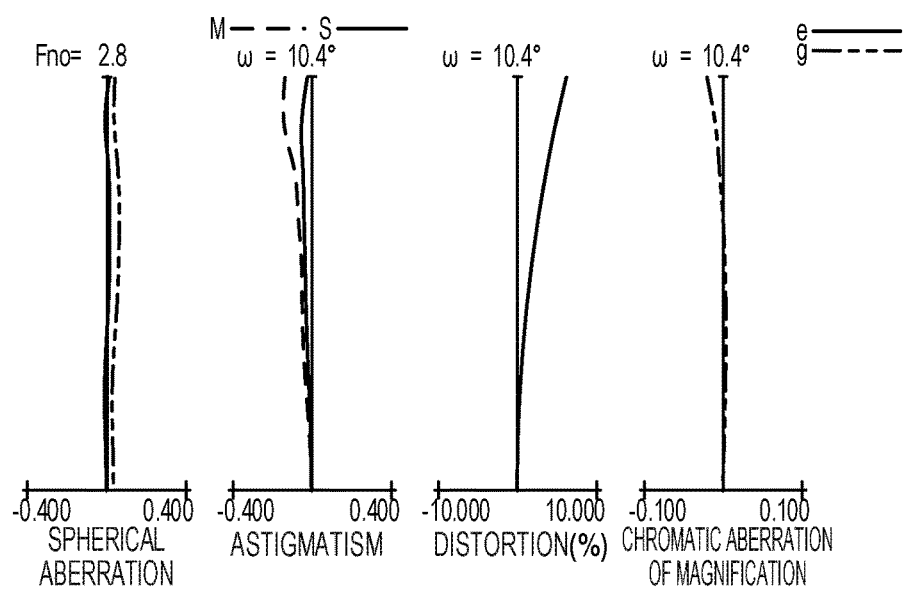
FIG. 12B shows aberration diagrams of Embodiment 6 when focused at infinity at a focal length of 77 mm.
Figure 12C:
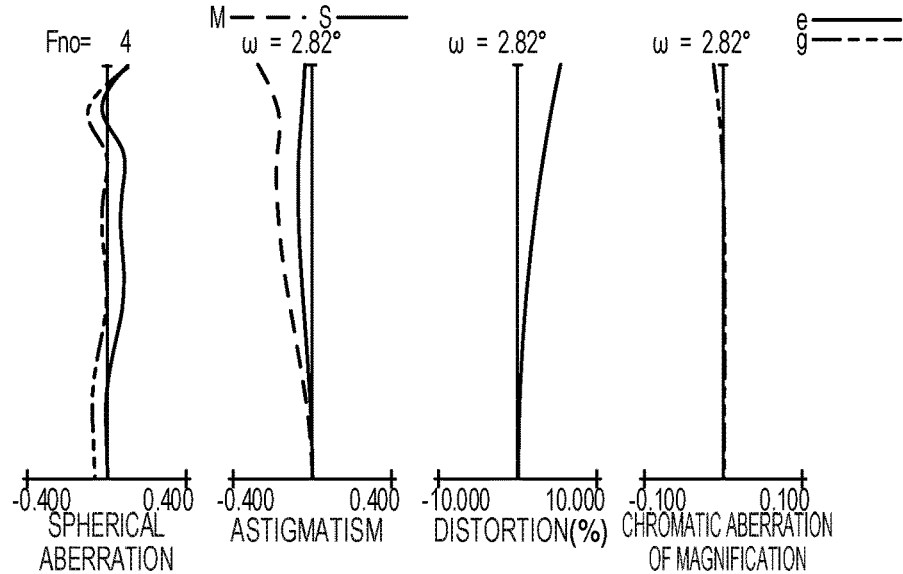
FIG. 12C shows aberration diagrams of Embodiment 6 when focused at infinity at a telephoto end.
Figure 13:
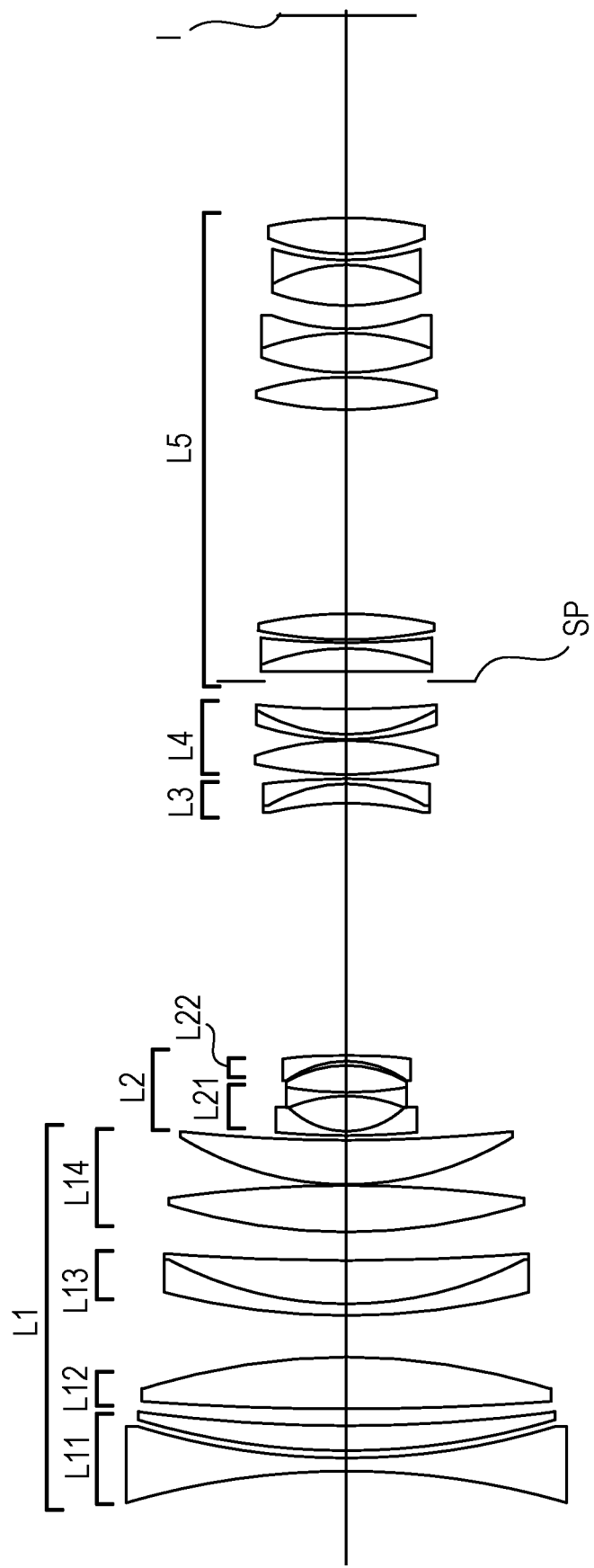
FIG. 13 is a cross-sectional view of Embodiment 7 of the present invention when focused at infinity at a wide-angle end.
Figure 14A:
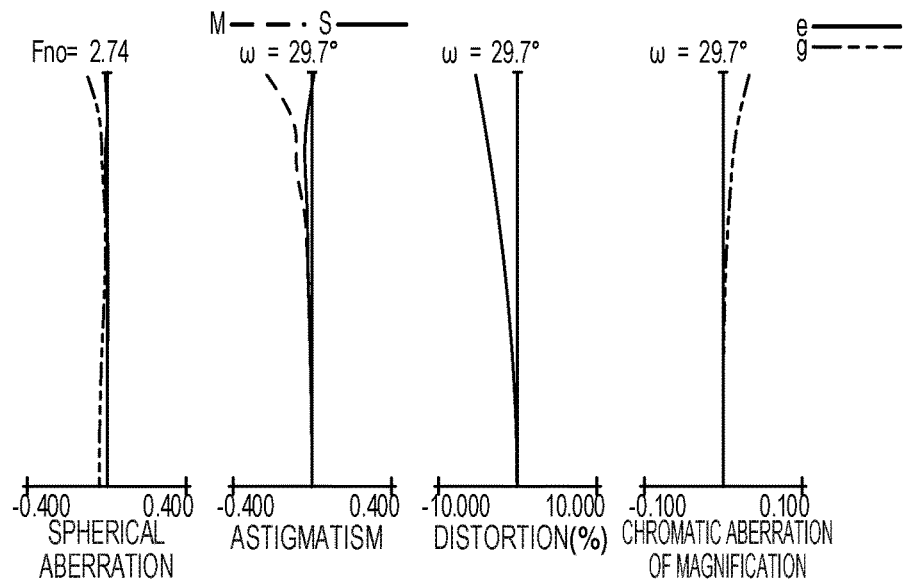
FIG. 14A shows aberration diagrams of Embodiment 7 when focused at infinity at the wide-angle end.
Figure 14B:
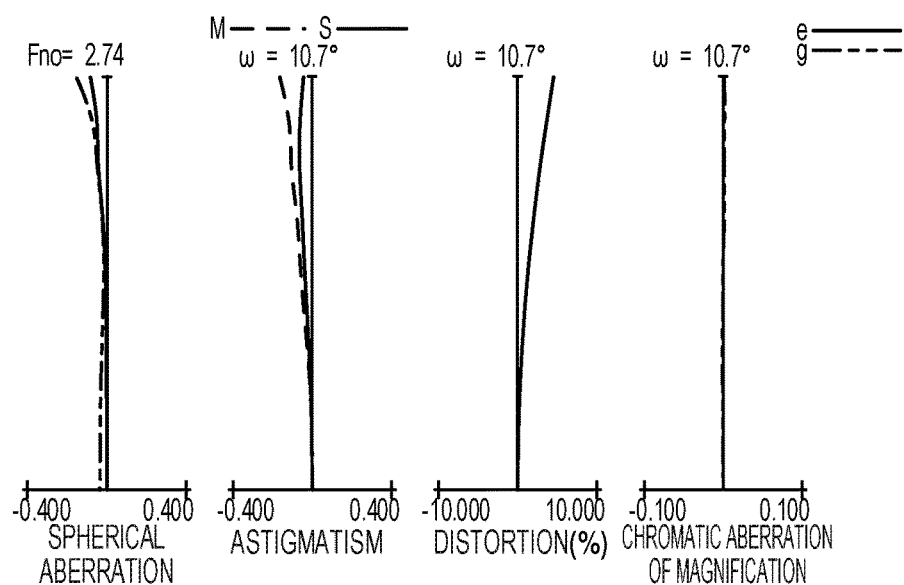
FIG. 14B shows aberration diagrams of Embodiment 7 when focused at infinity at a focal length of 77 mm.
Figure 14C:
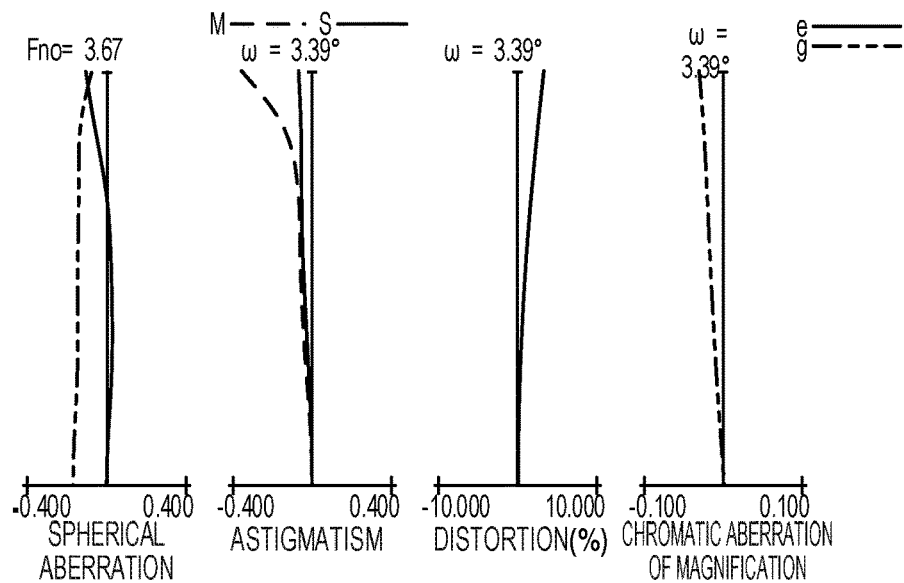
FIG. 14C shows aberration diagrams of Embodiment 7 when focused at infinity at a telephoto end.

FIG. 1 is a lens cross-sectional view of Numerical Embodiment 1 as Embodiment 1 of the present invention when the zoom lens is focused on an object at infinity at the wide-angle end. FIG. 2A, FIG. 2B, and FIG. 2C show longitudinal aberration diagrams of Numerical Embodiment 1 when the zoom lens is focused on the object at infinity at the wide-angle end, a focal length of 77 mm, and the telephoto end, respectively. In the longitudinal aberration diagrams, spherical aberration is shown with respect to an e-line (solid line) and the g-line (broken line). Astigmatism is shown for a meridional image plane (broken line) and a sagittal image plane (solid line) with respect to the e-line. The chromatic aberration of magnification is expressed by the g-line (broken line). Fno represents an f-number, and "w" represents a photographing half angle of view. In the longitudinal aberration diagrams, spherical aberration, astigmatism, distortion, and chromatic aberration of magnification are drawn on the scales of 0.4 mm, 0.4 mm, 10%, and 0.1 mm, respectively.

As illustrated in FIG. 1, the zoom lens according to Embodiment 1 includes, in order from the object side to the image side, a front lens unit L1 having a positive refractive power, which is configured not to move for zooming, and an intermediate lens unit L2 having a negative refractive power, which is configured to move for zooming. The intermediate lens unit L2 is configured to move monotonously toward an image plane side on the optical axis to perform zooming from the wide-angle end to the telephoto end. A first rear lens unit L3 having a negative refractive power is configured to move from the image side toward the object side on the optical axis from the wide-angle end to an intermediate zoom position, and to move from the object side toward the image side on the optical axis from the intermediate zoom position to the telephoto end. A second rear lens unit L4 having a positive refractive power is configured to move on the optical axis from the wide-angle end to the telephoto end. On the image side of the second rear lens unit L4, a third rear lens unit L5 having a positive refractive power, which is configured not to move for zooming, is included. The third rear lens unit L5 includes a stop SP closest to the object side. In FIG. 1, an image pickup surface is denoted by I.

The front lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The front lens unit L1 corresponds to the 1st surface to the 13th surface, and consists of seven lenses. The first sub-lens unit L11 corresponds to the 1st surface to the 4th surface, and consists of one negative lens and one positive lens. The second sub-lens unit L12 corresponds to the 5th surface and the 6th surface, and consists of one positive lens. The third sub-lens unit L13 corresponds to the 7th surface to the 9th surface, and consists of one positive lens and one negative lens. The fourth sub-lens unit L14 corresponds to the 10th surface to the 13th surface, and consists of two positive lenses.

The intermediate lens unit L2 corresponds to the 14th surface to the 20th surface, and consists of three negative lenses and one positive lens. The first rear lens unit L3 corresponds to the 21st surface to the 23rd surface, and consists of one negative lens and one positive lens. The second rear lens unit L4 corresponds to the 24th surface to the 28th surface, and consists of one negative lens and two positive lenses. The third rear lens unit L5 corresponds to the 29th surface to the 44th surface, and consists of three negative lenses and six positive lenses.

Values corresponding to the conditional expressions of Embodiment 1 are shown in Table 1. Embodiment 1 satisfies all the conditional expressions (1) to (9), and achieves satisfactory optical performance while achieving the high magnification with a compact and lightweight zoom lens.

Embodiment 2

A zoom lens according to Embodiment 2 of the present invention is specifically described with reference to FIG. 3, FIG. 4A, FIG. 4B, and FIG. 4C.

The zoom lens according to Embodiment 2 consists of, in order from the object side to the image side, a front lens unit L1 having a positive refractive power, which is configured not to move for zooming, an intermediate lens unit L2 having a negative refractive power, which is configured to move monotonously toward an image plane side on the optical axis to perform zooming from the wide-angle end to the telephoto end, a first rear lens unit L3 having a negative refractive power, which is configured to move from the image side toward the object side on the optical axis from the wide-angle end to an intermediate zoom position, and to move from the object side toward the image side on the optical axis from the intermediate zoom position to the telephoto end, a second rear lens unit L4 having a positive refractive power, which is configured to move on the optical axis from the wide-angle end to the telephoto end, and a third rear lens unit L5 having a positive refractive power, which is configured not to move for zooming. The third rear lens unit L5 includes a stop SP closest to the object side. An image pickup surface is denoted by I.

The front lens unit L1 consists of a first lens sub-unit L11 having a negative refractive power, a second lens sub-unit L12 having a positive refractive power, and a third lens sub-unit L13 having a positive refractive power. The second lens sub-unit L12 is caused to move from the image side toward the object side, and the third lens sub-unit L13 is caused to move from the image side toward the object side, to thereby focus on an object at short distance.

The front lens unit L1 corresponds to the 1st surface to the 12th surface, and consists of six lenses. The first sub-lens unit L11 corresponds to the 1st surface to the 6th surface, and consists of one negative lens and two positive lenses. The second sub-lens unit L12 corresponds to the 7th surface to the 10th surface, and consists of two positive lenses. The third sub-lens unit L13 corresponds to the 11th surface and the 12th surface, and consists of one positive lens.

The intermediate lens unit L2 corresponds to the 13th surface to the 19th surface, and consists of three negative lenses and one positive lens. The first rear lens unit L3 corresponds to the 20th surface to the 22nd surface, and consists of one negative lens and one positive lens. The second rear lens unit L4 corresponds to the 23rd surface and the 24th surface, and consists of one positive lens. The third rear lens unit L5 corresponds to the 25th surface to the 38th surface, and consists of three negative lenses and five positive lenses.

Values corresponding to the conditional expressions of Embodiment 2 are shown in Table 1. Embodiment 2 satisfies all the conditional expressions (1) to (9), and achieves satisfactory optical performance while achieving the high magnification with a compact and lightweight zoom lens.

Embodiment 3

A zoom lens according to Embodiment 3 of the present invention is specifically described with reference to FIG. 5, FIG. 6A, FIG. 6B, and FIG. 6C.

The zoom lens according to Embodiment 3 consists of, in order from the object side to the image side, a front lens unit L1 having a positive refractive power, which is configured not to move for zooming, an intermediate lens unit L2 having a negative refractive power, which is configured to move monotonously toward an image plane side on the optical axis to perform zooming from the wide-angle end to the telephoto end, a first rear lens unit L3 having a negative refractive power, which is configured to move from the image side toward the object side on the optical axis from the wide-angle end to an intermediate zoom position, and to move from the object side toward the image side on the optical axis from the intermediate zoom position to the telephoto end, a second rear lens unit L4 having a positive refractive power, which is configured to move on the optical axis from the wide-angle end to the telephoto end, a stop SP configured to move along the same locus as that of the second rear lens unit L4 during zooming, and a third rear lens unit L5 having a positive refractive power, which is configured not to move for zooming. An image pickup surface is denoted by I.

Further, the front lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The front lens unit L1 corresponds to the 1st surface to the 13th surface, and consists of seven lenses. The first sub-lens unit L11 corresponds to the 1st surface to the 4th surface, and consists of one negative lens and one positive lens. The second sub-lens unit L12 corresponds to the 5th surface and the 6th surface, and consists of one positive lens. The third sub-lens unit L13 corresponds to the 7th surface to the 9th surface, and consists of one positive lens and one negative lens. The fourth sub-lens unit L14 corresponds to the 10th surface to the 13th surface, and consists of two positive lenses.

The intermediate lens unit L2 corresponds to the 14th surface to the 20th surface, and consists of three negative lenses and one positive lens. The first rear lens unit L3 corresponds to the 21st surface to the 23rd surface, and consists of one negative lens and one positive lens. The second rear lens unit L4 corresponds to the 24th surface to the 29th surface, and consists of one negative lens and two positive lenses. The third rear lens unit L5 corresponds to the 30th surface to the 43rd surface, and consists of three negative lenses and five positive lenses.

Values corresponding to the conditional expressions of Embodiment 3 are shown in Table 1. Embodiment 3 satisfies all the conditional expressions (1) to (9), and achieves satisfactory optical performance while achieving the high magnification with a compact and lightweight zoom lens.

Embodiment 4

A zoom lens according to Embodiment 4 of the present invention is specifically described with reference to FIG. 7, FIG. 8A, FIG. 8B, and FIG. 8C.

The zoom lens according to Embodiment 4 consists of, in order from the object side to the image side, a front lens unit L1 having a positive refractive power, which is configured not to move for zooming, an intermediate lens unit L2 having a negative refractive power, which is configured to move monotonously toward an image plane side on the optical axis to perform zooming from the wide-angle end to the telephoto end, a first rear lens unit L3 having a negative refractive power, which is configured to move from the image side toward the object side on the optical axis from the wide-angle end to an intermediate zoom position, and to move from the object side toward the image side on the optical axis from the intermediate zoom position to the telephoto end, a second rear lens unit L4 having a positive refractive power, which is configured to move on the optical axis from the wide-angle end to the telephoto end, and a third rear lens unit L5 having a positive refractive power, which is configured not to move for zooming. The third rear lens unit L5 includes a stop SP closest to the object side. An image pickup surface is denoted by I.

The front lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The front lens unit L1 corresponds to the 1st surface to the 13th surface, and consists of seven lenses. The first sub-lens unit L11 corresponds to the 1st surface to the 4th surface, and consists of one negative lens and one positive lens. The second sub-lens unit L12 corresponds to the 5th surface and the 6th surface, and consists of one positive lens. The third sub-lens unit L13 corresponds to the 7th surface to the 9th surface, and consists of one positive lens and one negative lens. The fourth sub-lens unit L14 corresponds to the 10th surface to the 13th surface, and consists of two positive lenses.

The intermediate lens unit L2 corresponds to the 14th surface to the 20th surface, and consists of three negative lenses and one positive lens. The first rear lens unit L3 corresponds to the 21st surface to the 23rd surface, and consists of one negative lens and one positive lens. The second rear lens unit L4 corresponds to the 24th surface to the 28th surface, and consists of one negative lens and two positive lenses. The third rear lens unit L5 corresponds to the 29th surface to the 44th surface, and consists of three negative lenses and six positive lenses.

Values corresponding to the conditional expressions of Embodiment 4 are shown in Table 1. Embodiment 4 satisfies all the conditional expressions (1) to (9), and achieves satisfactory optical performance while achieving the high magnification with a compact and lightweight zoom lens.

Embodiment 5

A zoom lens according to Embodiment 5 of the present invention is specifically described with reference to FIG. 9, FIG. 10A, FIG. 10B, and FIG. 10C.

The zoom lens according to Embodiment 5 consists of, in order from the object side to the image side, a front lens unit L1 having a positive refractive power, which is configured not to move for zooming, an intermediate lens unit L2 having a negative refractive power, which is configured to move monotonously toward an image plane side on the optical axis to perform zooming from the wide-angle end to the telephoto end, a first rear lens unit L3 having a negative refractive power, which is configured to move from the image side toward the object side on the optical axis from the wide-angle end to an intermediate zoom position, and to move from the object side toward the image side on the optical axis from the intermediate zoom position to the telephoto end, a second rear lens unit L4 having a positive refractive power, which is configured to move on the optical axis from the wide-angle end to the telephoto end, and a third rear lens unit L5 having a positive refractive power, which is configured not to move for zooming. The third rear lens unit L5 includes a stop SP closest to the object side. An image pickup surface is denoted by I.

The front lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The front lens unit L1 corresponds to the 1st surface to the 13th surface, and consists of seven lenses. The first sub-lens unit L11 corresponds to the 1st surface to the 4th surface, and consists of one negative lens and one positive lens. The second sub-lens unit L12 corresponds to the 5th surface and the 6th surface, and consists of one positive lens. The third sub-lens unit L13 corresponds to the 7th surface to the 9th surface, and consists of one positive lens and one negative lens. The fourth sub-lens unit L14 corresponds to the 10th surface to the 13th surface, and consists of two positive lenses.

The intermediate lens unit L2 corresponds to the 14th surface to the 20th surface, and consists of three negative lenses and one positive lens. The first rear lens unit L3 corresponds to the 21st surface to the 23rd surface, and consists of one negative lens and one positive lens. The second rear lens unit L4 corresponds to the 24th surface to the 28th surface, and consists of one negative lens and two positive lenses. The third rear lens unit L5 corresponds to the 29th surface to the 44th surface, and consists of three negative lenses and six positive lenses.

Values corresponding to the conditional expressions of Embodiment 5 are shown in Table 1. Embodiment 5 satisfies all the conditional expressions (1) to (9), and achieves satisfactory optical performance while achieving the high magnification with a compact and lightweight zoom lens.

Embodiment 6

A zoom lens according to Embodiment 6 of the present invention is specifically described with reference to FIG. 11, FIG. 12A, FIG. 12B, and FIG. 12C.

The zoom lens according to Embodiment 6 consists of, in order from the object side to the image side, a front lens unit L1 having a positive refractive power, which is configured not to move for zooming, an intermediate lens unit L2 having a negative refractive power, which is configured to move monotonously toward an image plane side on the optical axis to perform zooming from the wide-angle end to the telephoto end, a first rear lens unit L3 having a negative refractive power, which is configured to move from the image side toward the object side on the optical axis from the wide-angle end to an intermediate zoom position, and to move from the object side toward the image side on the optical axis from the intermediate zoom position to the telephoto end, a second rear lens unit L4 having a positive refractive power, which is configured to move on the optical axis from the wide-angle end to the telephoto end, and a third rear lens unit L5 having a positive refractive power, which is configured not to move for zooming. The third rear lens unit L5 includes a stop SP closest to the object side. An image pickup surface is denoted by I.

The front lens unit L1 consists of a first lens sub-unit L11 having a negative refractive power, a second lens sub-unit L12 having a positive refractive power, and a third lens sub-unit L13 having a positive refractive power. The second lens sub-unit L12 is caused to move from the image side toward the object side, and the third lens sub-unit L13 is caused to move from the image side toward the object side, to thereby focus on an object at short distance.

The front lens unit L1 corresponds to the 1st surface to the 12th surface, and consists of six lenses. The first sub-lens unit L11 corresponds to the 1st surface to the 6th surface, and consists of one negative lens and two positive lenses. The second sub-lens unit L12 corresponds to the 7th surface to the 10th surface, and consists of two positive lenses. The third sub-lens unit L13 corresponds to the 11th surface and the 12th surface, and consists of one positive lens.

The intermediate lens unit L2 corresponds to the 13th surface to the 19th surface, and consists of three negative lenses and one positive lens. The first rear lens unit L3 corresponds to the 20th surface to the 22nd surface, and consists of one negative lens and one positive lens. The second rear lens unit L4 corresponds to the 23rd surface to the 27th surface, and consists of one negative lens and two positive lenses. The third rear lens unit L5 corresponds to the 25th surface to the 38th surface, and consists of three negative lenses and five positive lenses.

Values corresponding to the conditional expressions of Embodiment 6 are shown in Table 1. Embodiment 6 satisfies all the conditional expressions (1) to (9), and achieves satisfactory optical performance while achieving the high magnification with a compact and lightweight zoom lens.

Embodiment 7

A zoom lens according to Embodiment 7 of the present invention is specifically described with reference to FIG. 13, FIG. 14A, FIG. 14B, and FIG. 14C.

The zoom lens according to Embodiment 7 consists of, in order from the object side to the image side, a front lens unit L1 having a positive refractive power, which is configured not to move for zooming, an intermediate lens unit L2 having a negative refractive power, which is configured to move monotonously toward an image plane side on the optical axis to perform zooming from the wide-angle end to the telephoto end, a first rear lens unit L3 having a negative refractive power, which is configured to move from the image side toward the object side on the optical axis from the wide-angle end to an intermediate zoom position, and to move from the object side toward the image side on the optical axis from the intermediate zoom position to the telephoto end, a second rear lens unit L4 having a positive refractive power, which is configured to move on the optical axis from the wide-angle end to the telephoto end, and a third rear lens unit L5 having a positive refractive power, which is configured not to move for zooming. The third rear lens unit L5 includes a stop SP closest to the object side. An image pickup surface is denoted by I. The intermediate lens unit L2 consists of a first intermediate lens unit L21 having a negative refractive power, and a second intermediate lens unit L22 having a negative refractive power, and is configured to move while changing an interval between the first intermediate lens unit L21 and the second intermediate lens unit L22 from the wide-angle end to the telephoto end.

The front lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The front lens unit L1 corresponds to the 1st surface to the 13th surface, and consists of seven lenses. The first sub-lens unit L11 corresponds to the 1st surface to the 4th surface, and consists of one negative lens and one positive lens. The second sub-lens unit L12 corresponds to the 5th surface and the 6th surface, and consists of one positive lens. The third sub-lens unit L13 corresponds to the 7th surface to the 9th surface, and consists of one positive lens and one negative lens. The fourth sub-lens unit L14 corresponds to the 10th surface to the 13th surface, and consists of two positive lenses.

The intermediate lens unit L2 corresponds to the 14th surface to the 20th surface, and consists of the first intermediate lens unit L21 and the second intermediate lens unit L22. The first intermediate lens unit L21 corresponds to the 14th surface to the 18th surface, and consists of two negative lenses and one positive lens. The second intermediate lens unit L22 corresponds to the 19th surface and the 20th surface, and consists of one negative lens. The first rear lens unit L3 corresponds to the 21st surface to the 23rd surface, and consists of one negative lens and one positive lens. The second rear lens unit L4 corresponds to the 24th surface to the 28th surface, and consists of one negative lens and two positive lenses. The third rear lens unit L5 corresponds to the 29th surface to the 44th surface, and consists of three negative lenses and six positive lenses.

Values corresponding to the conditional expressions of Embodiment 7 are shown in Table 1. A focal length of the intermediate lens unit L2 is a combined focal length of the first intermediate lens unit L21 and the second intermediate lens unit L22 at the wide-angle end, and is −18.55 mm. Embodiment 7 satisfies all the conditional expressions (1) to (9), and achieves satisfactory optical performance while achieving the high magnification with a compact and light-weight zoom lens.

The exemplary embodiments of the present invention are described above, but the present invention is not limited to those embodiments and can be modified and changed variously within the scope of the gist thereof.

In the following, Numerical Embodiments corresponding to Embodiments of the present invention are shown. In each of the Numerical Embodiments, symbol "i" represents the order of a surface from the object side, symbol "ri" represents a curvature radius of the i-th surface from the object side, symbol "di" represents an interval between the i-th surface and the (i+1)th surface from the object side, and symbols "ndi", "vdi", and "θgFi" represent a refractive index, an Abbe number, and a partial dispersion ratio of an optical member between the i-th surface and the (i+1)th surface, respectively. Symbol BF represents an air-equivalent back focus. The last three surfaces correspond to a glass block, for example, a filter.

When an X axis is set in the optical axis direction, an H axis is set in a direction perpendicular to the optical axis, a direction of travel of light is defined as positive, a paraxial curvature radius is represented by R, a conic constant is represented by "k", and aspherical coefficients are represented by A4, A6, A8, A10, A12, A14, and A16, the aspherical shape is expressed by the following expression. Further, "e-z" represents "×10$^{-z}$".

$$X = \frac{H^2/R}{1 + \sqrt{1 - (1+k)(H/R)^2}} + A4H^4 + A6H^6 + A8H^8 + A10H^{10} + A12H^{12} + A14H^{14} + A16H^{16}$$

Numerical Embodiment 1

| | | Unit: mm | | | | |
|---|---|---|---|---|---|---|
| Surface number | r | d | nd | vd | θgF | Focal length |
| 1 | −167.13232 | 2.80000 | 1.749505 | 35.33 | 0.5818 | −104.771 |
| 2 | 151.08605 | 1.59677 | | | | |
| 3 | 154.01861 | 5.33115 | 1.959060 | 17.47 | 0.6598 | 292.268 |
| 4 | 330.70825 | 3.62180 | | | | |
| 5 | 594.57929 | 11.14451 | 1.603112 | 60.64 | 0.5415 | 186.151 |
| 6 | −138.09196 | 8.87620 | | | | |
| 7 | 154.48815 | 2.50000 | 1.846660 | 23.78 | 0.6205 | −202.140 |
| 8 | 80.96588 | 9.29853 | 1.438750 | 94.66 | 0.5340 | 218.458 |
| 9 | 496.35864 | 6.12189 | | | | |
| 10 | 126.60002 | 10.00578 | 1.433870 | 95.10 | 0.5373 | 198.665 |
| 11 | −265.68737 | 0.20000 | | | | |
| 12 | 67.44222 | 9.48829 | 1.595220 | 67.74 | 0.5442 | 139.474 |
| 13 | 335.46222 | (Variable) | | | | |
| 14 | 155.82298 | 0.95000 | 1.755000 | 52.32 | 0.5474 | −26.352 |
| 15 | 17.66769 | 7.55810 | | | | |
| 16 | −31.69279 | 0.75000 | 1.496999 | 81.54 | 0.5375 | −44.294 |

-continued

| Unit: mm | | | | | | |
|---|---|---|---|---|---|---|
| 17 | 73.35231 | 5.79863 | 1.800000 | 29.84 | 0.6017 | 24.055 |
| 18 | −25.43887 | 0.93996 | | | | |
| 19 | −21.64494 | 1.20000 | 1.763850 | 48.49 | 0.5589 | −30.813 |
| 20 | −261.20188 | (Variable) | | | | |
| 21 | −67.68553 | 4.15111 | 1.808095 | 22.76 | 0.6307 | 72.034 |
| 22 | −32.33599 | 1.10000 | 1.905250 | 35.04 | 0.5848 | −46.252 |
| 23 | −141.10373 | (Variable) | | | | |
| 24 | 76.97248 | 7.28984 | 1.639999 | 60.08 | 0.5370 | 53.400 |
| 25 | −59.61422 | 0.19065 | | | | |
| 26 | 60.58535 | 1.10000 | 1.854780 | 24.80 | 0.6122 | −120.827 |
| 27 | 37.99653 | 5.40884 | 1.487490 | 70.23 | 0.5300 | 95.859 |
| 28 | 190.98280 | (Variable) | | | | |
| 29 | 0.00000 | 2.07412 | | | | |
| 30 | −27250.41983 | 4.98126 | 1.487490 | 70.23 | 0.5300 | 100.750 |
| 31 | −49.19537 | 1.20000 | 2.001000 | 29.14 | 0.5997 | −36.979 |
| 32 | 156.42440 | 0.69270 | | | | |
| 33 | 93.12560 | 5.55019 | 1.728250 | 28.46 | 0.6077 | 61.043 |
| 34 | −84.23585 | 43.77045 | | | | |
| 35 | 73.82797 | 6.99762 | 1.438750 | 94.66 | 0.5340 | 78.962 |
| 36 | −63.68762 | 0.94954 | | | | |
| 37 | 52.06539 | 8.48906 | 1.808095 | 22.76 | 0.6307 | 32.935 |
| 38 | −51.53334 | 0.90000 | 1.953750 | 32.32 | 0.5905 | −25.027 |
| 39 | 45.46110 | 5.00249 | | | | |
| 40 | 46.47962 | 8.75574 | 1.487490 | 70.23 | 0.5300 | 40.609 |
| 41 | −32.54260 | 1.00000 | 2.001000 | 29.14 | 0.5997 | −19.968 |
| 42 | 53.73204 | 1.35581 | | | | |
| 43 | 43.57517 | 7.71665 | 1.620041 | 36.26 | 0.5879 | 46.474 |
| 44 | −80.83264 | 43.38000 | | | | |
| Image plane | ∞ | | | | | |

Aspherical surface data

Sixth surface

K = −1.51267e+001  A4 = −6.49448e−007  A6 = 2.35413e−010  A8 = −9.02147e−014
A10 = 2.62134e−017  A12 = −3.74536e−021

Twentieth surface

K = 3.72020e+001  A4 = −9.83020e−006  A6 = −4.95860e−009  A8 = −2.35672e−011
A10 = 5.83243e−014  A12 = −2.06036e−016

Twenty-fourth surface

K = −1.45023e+000  A4 = −1.99598e−006  A6 = 6.26743e−010  A8 = 8.22589e−013
A10 = −4.34519e−015  A12 = 5.01150e−018

Various data
Zoom ratio 9.62

| Focal length | 25.99 | 49.06 | 77.47 | 177.00 | 249.99 |
|---|---|---|---|---|---|
| F-number | 2.74 | 2.74 | 2.73 | 2.74 | 3.67 |
| Half angle of view | 29.65 | 16.79 | 10.82 | 4.78 | 3.39 |
| Image height | 14.80 | 14.80 | 14.80 | 14.80 | 14.80 |
| Total lens length | 312.28 | 312.28 | 312.28 | 312.28 | 312.28 |
| BF | 43.38 | 43.38 | 43.38 | 43.38 | 43.38 |
| d13 | 0.99 | 21.33 | 34.04 | 48.67 | 51.84 |
| d20 | 54.15 | 17.22 | 4.53 | 2.21 | 2.01 |
| d23 | 0.91 | 14.14 | 18.11 | 8.55 | 0.97 |
| d28 | 5.99 | 9.35 | 5.35 | 2.61 | 7.22 |

Zoom lens unit data

| Unit | First surface | Focal length |
|---|---|---|
| 1 | 1 | 80.63 |
| 2 | 14 | −18.55 |
| 3 | 21 | −119.24 |
| 4 | 24 | 47.73 |
| 5 | 29 | 122.66 |

Numerical Embodiment 2

| Unit: mm | | | | | | |
|---|---|---|---|---|---|---|
| Surface number | r | d | nd | vd | θgF | Focal length |
| 1 | −174.44713 | 3.50000 | 1.673000 | 38.26 | 0.5757 | −120.260 |
| 2 | 153.97756 | 13.52357 | | | | |
| 3 | −155.81140 | 4.24581 | 1.433870 | 95.10 | 0.5373 | 1981.949 |
| 4 | −133.05063 | 0.20000 | | | | |
| 5 | 210.57057 | 12.84729 | 1.433870 | 95.10 | 0.5373 | 191.506 |
| 6 | −135.26466 | 9.47969 | | | | |
| 7 | 169.16697 | 8.10824 | 1.433870 | 95.10 | 0.5373 | 287.100 |
| 8 | −470.04348 | −0.36686 | | | | |
| 9 | 118.33069 | 7.66664 | 1.433870 | 95.10 | 0.5373 | 260.021 |
| 10 | −2507.61134 | 0.32183 | | | | |
| 11 | 75.69552 | 7.25716 | 1.438750 | 94.66 | 0.5340 | 223.156 |
| 12 | 321.10645 | (Variable) | | | | |
| 13 | 218.47799 | 1.30000 | 2.000690 | 25.46 | 0.6133 | −23.375 |
| 14 | 21.24159 | 6.21064 | | | | |
| 15 | −39.62224 | 1.10000 | 1.696797 | 55.53 | 0.5434 | −24.744 |
| 16 | 31.10792 | 6.62281 | 1.854780 | 24.80 | 0.6122 | 18.621 |
| 17 | −29.95590 | 1.76093 | | | | |
| 18 | −23.58238 | 1.10000 | 1.729157 | 54.68 | 0.5444 | −44.085 |
| 19 | −89.20868 | (Variable) | | | | |
| 20 | −51.11450 | 1.30000 | 1.882997 | 40.76 | 0.5667 | −45.959 |
| 21 | 205.06221 | 2.86492 | 1.959060 | 17.47 | 0.6598 | 110.954 |
| 22 | −225.86529 | (Variable) | | | | |
| 23 | 75.72234 | 6.68565 | 1.729157 | 54.68 | 0.5444 | 43.021 |
| 24 | −51.94086 | (Variable) | | | | |
| 25 | 0.00000 | 1.98376 | | | | |
| 26 | 316.90994 | 5.16281 | 1.496999 | 81.54 | 0.5375 | 83.143 |
| 27 | −47.41995 | 1.40000 | 1.953750 | 32.32 | 0.5898 | −95.695 |
| 28 | −99.34837 | 36.99807 | | | | |
| 29 | 79.54948 | 5.76096 | 1.487490 | 70.23 | 0.5300 | 66.145 |
| 30 | −53.23798 | 4.59526 | | | | |
| 31 | 62.81674 | 5.79614 | 1.540720 | 47.23 | 0.5651 | 45.978 |
| 32 | −40.14168 | 1.20000 | 2.000690 | 25.46 | 0.6133 | −17.917 |
| 33 | 33.44447 | 1.92705 | | | | |
| 34 | 36.25507 | 5.10213 | 1.487490 | 70.23 | 0.5300 | 62.492 |
| 35 | −185.85375 | 17.74395 | | | | |
| 36 | −132004.53376 | 1.20000 | 1.882997 | 40.76 | 0.5667 | −48.932 |
| 37 | 43.47320 | 6.13029 | 1.808095 | 22.76 | 0.6307 | 36.819 |
| 38 | −91.25475 | 40.00000 | | | | |
| Image plane | ∞ | | | | | |

Aspherical surface data

Twelfth surface

K = 0.00000e+000  A4 = 6.38519e−008  A6 = −7.88128e−012  A8 = −5.68076e−015
A10 = 4.12523e−018

Nineteenth surface

K = −9.79176e−001  A4 = −6.36288e−006  A6 = −3.06175e−009  A8 = −1.92956e−010
A10 = 4.12826e−012  A12 = −3.83290e−014  A14 = 1.64257e−016  A16 = −2.68157e−019

Twenty-third surface

K = 1.29259e+000  A4 = −3.83963e−006  A6 = 7.01924e−010  A8 = 8.61632e−012
A10 = −9.42896e−014  A12 = 4.99889e−016  A14 = −1.28949e−018  A16 = 1.27458e−021

Various data
Zoom ratio 10.00

| | | | | | |
|---|---|---|---|---|---|
| Focal length | 22.00 | 41.91 | 69.14 | 166.00 | 220.00 |
| F-number | 2.80 | 2.80 | 2.80 | 2.80 | 3.70 |
| Half angle of view | 33.93 | 19.45 | 12.08 | 5.09 | 3.85 |
| Image height | 14.80 | 14.80 | 14.80 | 14.80 | 14.80 |
| Total lens length | 293.81 | 293.81 | 293.81 | 293.81 | 293.81 |
| BF | 40.00 | 40.00 | 40.00 | 40.00 | 40.00 |
| d12 | 1.49 | 24.06 | 38.17 | 54.75 | 57.93 |

-continued

| Unit: mm | | | | | |
|---|---|---|---|---|---|
| d19 | 59.74 | 26.23 | 10.28 | 1.44 | 1.75 |
| d22 | 0.93 | 8.14 | 11.48 | 5.97 | 0.84 |
| d24 | 0.92 | 4.66 | 3.15 | 0.91 | 2.57 |

| Zoom lens unit data | | |
|---|---|---|
| Unit | First surface | Focal length |
| 1 | 1 | 78.40 |
| 2 | 13 | −20.20 |
| 3 | 20 | −79.99 |
| 4 | 23 | 43.02 |
| 5 | 25 | 112.67 |

Numerical Embodiment 3

| Unit: mm | | | | | |
|---|---|---|---|---|---|
| Surface number | r | d | nd | νd | θgF | Focal length |
| 1 | −187.34760 | 2.80000 | 1.749505 | 35.33 | 0.5818 | −107.077 |
| 2 | 142.96567 | 1.81242 | | | | |
| 3 | 145.78560 | 5.08914 | 1.959060 | 17.47 | 0.6598 | 296.506 |
| 4 | 289.97743 | 5.71212 | | | | |
| 5 | 1169.20294 | 9.58239 | 1.603112 | 60.64 | 0.5415 | 211.870 |
| 6 | −143.64819 | 10.44174 | | | | |
| 7 | 168.49773 | 2.50000 | 1.846660 | 23.78 | 0.6205 | −216.746 |
| 8 | 87.65240 | 9.02708 | 1.438750 | 94.66 | 0.5340 | 231.430 |
| 9 | 611.01826 | 6.72074 | | | | |
| 10 | 130.68204 | 10.23282 | 1.433870 | 95.10 | 0.5373 | 201.316 |
| 11 | −259.09528 | 0.20000 | | | | |
| 12 | 71.70856 | 9.62572 | 1.595220 | 67.74 | 0.5442 | 152.849 |
| 13 | 317.41519 | (Variable) | | | | |
| 14 | 150.88747 | 0.95000 | 1.755000 | 52.32 | 0.5474 | −28.632 |
| 15 | 18.93201 | 7.60525 | | | | |
| 16 | −32.68846 | 0.75000 | 1.496999 | 81.54 | 0.5375 | −46.098 |
| 17 | 77.93971 | 6.52518 | 1.800000 | 29.84 | 0.6017 | 25.743 |
| 18 | −27.23537 | 1.21261 | | | | |
| 19 | −22.74888 | 1.00000 | 1.763850 | 48.49 | 0.5589 | −32.488 |
| 20 | −264.15633 | (Variable) | | | | |
| 21 | −68.87046 | 4.20855 | 1.808095 | 22.76 | 0.6307 | 71.658 |
| 22 | −32.50154 | 1.00000 | 1.905250 | 35.04 | 0.5848 | −46.021 |
| 23 | −146.51296 | (Variable) | | | | |
| 24 | 0.00000 | 0.89557 | | | | |
| 25 | 71.56910 | 7.34886 | 1.595220 | 67.74 | 0.5442 | 55.933 |
| 26 | −60.25431 | 0.18000 | | | | |
| 27 | 307.27308 | 1.10000 | 1.854780 | 24.80 | 0.6122 | −151.569 |
| 28 | 91.58825 | 3.98863 | 1.487490 | 70.23 | 0.5300 | 160.510 |
| 29 | −542.09458 | (Variable) | | | | |
| 30 | 64.47382 | 1.20000 | 2.001000 | 29.14 | 0.5997 | −139.179 |
| 31 | 43.77557 | 1.50078 | | | | |
| 32 | 44.10098 | 6.44967 | 1.487490 | 70.23 | 0.5300 | 80.357 |
| 33 | −344.16015 | 42.86354 | | | | |
| 34 | 445.95144 | 7.74046 | 1.438750 | 94.66 | 0.5340 | 93.468 |
| 35 | −45.04750 | 0.91674 | | | | |
| 36 | 198.82053 | 8.96132 | 1.808095 | 22.76 | 0.6307 | 32.999 |
| 37 | −30.53292 | 0.90000 | 1.953750 | 32.32 | 0.5905 | −28.016 |
| 38 | 230.49349 | 3.26071 | | | | |

-continued

| Unit: mm | | | | | | |
|---|---|---|---|---|---|---|
| 39 | 57.82481 | 8.84840 | 1.487490 | 70.23 | 0.5300 | 45.646 |
| 40 | −34.54381 | 1.00000 | 2.001000 | 29.14 | 0.5997 | −20.799 |
| 41 | 54.26724 | 0.98270 | | | | |
| 42 | 45.86785 | 7.96685 | 1.647689 | 33.79 | 0.5938 | 46.466 |
| 43 | −83.20366 | 42.45000 | | | | |
| Image plane | ∞ | | | | | |

Aspherical surface data

Sixth surface

K = −1.38433e+001  A4 = −5.43792e−007  A6 = 1.69049e−010  A8 = −6.26109e−014
A10 = 1.88611e−017  A12 = −2.80918e−021

Twentieth surface

K = −1.16037e+003  A4 = −1.59352e−005  A6 = 4.37497e−008  A8 = −2.59520e−010
A10 = 8.02872e−013  A12 = −1.14954e−015

Twenty-fifth surface

K = −1.35953e+000  A4 = −2.53573e−006  A6 = 1.02275e−009  A8 = −1.41297e−013
A10 = −1.81339e−015  A12 = 2.38517e−018

Various data
Zoom ratio 9.62

| | | | | | |
|---|---|---|---|---|---|
| Focal length | 26.00 | 48.66 | 78.18 | 179.50 | 250.00 |
| F-number | 2.74 | 2.74 | 2.73 | 2.74 | 3.67 |
| Half angle of view | 29.65 | 16.92 | 10.72 | 4.71 | 3.39 |
| Image height | 14.80 | 14.80 | 14.80 | 14.80 | 14.80 |
| Total lens length | 313.57 | 313.57 | 313.57 | 313.57 | 313.57 |
| BF | 42.45 | 42.45 | 42.45 | 42.45 | 42.45 |
| d13 | 0.99 | 23.94 | 38.28 | 54.79 | 58.36 |
| d20 | 54.43 | 16.56 | 3.42 | 2.53 | 2.42 |
| d23 | 0.97 | 14.54 | 18.57 | 8.34 | 1.00 |
| d29 | 11.63 | 12.97 | 7.74 | 2.36 | 6.23 |

Zoom lens unit data

| Unit | First surface | Focal length |
|---|---|---|
| 1 | 1 | 86.85 |
| 2 | 14 | −19.60 |
| 3 | 21 | −118.82 |
| 4 | 24 | 57.07 |
| 5 | 30 | 105.67 |

Numerical Embodiment 4

| Unit: mm | | | | | | |
|---|---|---|---|---|---|---|
| Surface number | r | d | nd | νd | θgF | Focal length |
| 1 | −255.86413 | 2.70000 | 1.749505 | 35.33 | 0.5818 | −110.462 |
| 2 | 124.17450 | 1.26279 | | | | |
| 3 | 130.00399 | 5.33282 | 1.959060 | 17.47 | 0.6598 | 294.334 |
| 4 | 233.48777 | 1.62820 | | | | |
| 5 | 154.36409 | 11.97476 | 1.603112 | 60.64 | 0.5415 | 154.691 |
| 6 | −231.21832 | 9.64989 | | | | |
| 7 | 172.78328 | 2.40000 | 1.854780 | 24.80 | 0.6122 | −132.803 |
| 8 | 68.45633 | 10.53411 | 1.438750 | 94.66 | 0.5340 | 171.474 |
| 9 | 706.17494 | 5.91133 | | | | |
| 10 | 94.33991 | 9.64128 | 1.433870 | 95.10 | 0.5373 | 190.503 |
| 11 | −659.90884 | 0.20000 | | | | |
| 12 | 81.76972 | 8.31624 | 1.763850 | 48.49 | 0.5589 | 120.455 |
| 13 | 675.92070 | (Variable) | | | | |
| 14 | 421.09085 | 0.90000 | 1.763850 | 48.49 | 0.5589 | −23.353 |
| 15 | 17.17801 | 6.33773 | | | | |
| 16 | −43.66234 | 0.75000 | 1.763850 | 48.49 | 0.5589 | −26.795 |
| 17 | 39.17645 | 6.47622 | 1.854780 | 24.80 | 0.6122 | 18.629 |
| 18 | −25.17447 | 1.16499 | | | | |
| 19 | −20.98153 | 1.00000 | 1.800999 | 34.97 | 0.5864 | −30.369 |

-continued

| | | Unit: mm | | | | |
|---|---|---|---|---|---|---|
| 20 | −149.55113 | (Variable) | | | | |
| 21 | −49.60980 | 1.30000 | 1.891900 | 37.13 | 0.5780 | −39.180 |
| 22 | 122.30096 | 3.83215 | 1.892860 | 20.36 | 0.6393 | 76.758 |
| 23 | −157.65496 | (Variable) | | | | |
| 24 | 87.52996 | 6.41298 | 1.712995 | 53.87 | 0.5459 | 49.334 |
| 25 | −57.43189 | 0.19184 | | | | |
| 26 | 47.43691 | 1.10000 | 1.854780 | 24.80 | 0.6122 | −140.672 |
| 27 | 33.74148 | 6.22171 | 1.438750 | 94.66 | 0.5340 | 88.274 |
| 28 | 243.05560 | (Variable) | | | | |
| 29 | 0.00000 | 1.92449 | | | | |
| 30 | 188.98008 | 7.38626 | 1.487490 | 70.23 | 0.5300 | 59.402 |
| 31 | −33.89468 | 1.80000 | 2.001000 | 29.14 | 0.5997 | −26.273 |
| 32 | 124.97658 | 6.10135 | | | | |
| 33 | 121.55348 | 6.54314 | 1.673000 | 38.26 | 0.5757 | 49.997 |
| 34 | −45.90760 | 40.35933 | | | | |
| 35 | 61.41162 | 5.37641 | 1.808095 | 22.76 | 0.6307 | 63.353 |
| 36 | −314.96876 | 9.41686 | | | | |
| 37 | 97.49028 | 6.23976 | 1.567322 | 42.82 | 0.5731 | 57.848 |
| 38 | −48.72723 | 1.10000 | 1.953750 | 32.32 | 0.5905 | −23.713 |
| 39 | 43.25967 | 3.22467 | | | | |
| 40 | 69.47495 | 9.81876 | 1.438750 | 94.66 | 0.5340 | 37.188 |
| 41 | −20.47123 | 1.10000 | 1.882997 | 40.76 | 0.5667 | −26.019 |
| 42 | −183.89126 | 0.28892 | | | | |
| 43 | 87.99168 | 9.14560 | 1.438750 | 94.66 | 0.5340 | 53.399 |
| 44 | −31.02338 | 38.79000 | | | | |
| Image plane | ∞ | | | | | |

Aspherical surface data

Sixth surface

K = 3.82270e−001   A4 = 1.40190e−007   A6 = −1.13514e−011   A8 = 6.54402e−015
A10 = −3.13083e−018   A12 = 4.10027e−022

Twentieth surface

K = 9.73806e+001   A4 = −7.65768e−006   A6 = 1.94257e−010   A8 = −1.69439e−011
A10 = 2.00669e−013   A12 = 4.14074e−017

Twenty-fourth surface

K = −3.64431e+000   A4 = −1.81921e−006   A6 = 1.13583e−009   A8 = 9.03131e−013
A10 = −7.37879e−015   A12 = 1.02297e−017

Various data
Zoom ratio 9.62

| Focal length | 26.00 | 49.96 | 80.96 | 179.00 | 250.00 |
|---|---|---|---|---|---|
| F-number | 3.12 | 3.12 | 3.12 | 3.11 | 3.67 |
| Half angle of view | 29.65 | 16.50 | 10.36 | 4.73 | 3.39 |
| Image height | 14.80 | 14.80 | 14.80 | 14.80 | 14.80 |
| Total lens length | 309.00 | 309.00 | 309.00 | 309.00 | 309.00 |
| BF | 38.79 | 38.79 | 38.79 | 38.79 | 38.79 |
| d13 | 1.28 | 19.85 | 31.46 | 44.68 | 47.70 |
| d20 | 48.44 | 16.88 | 4.34 | 2.24 | 2.22 |
| d23 | 0.83 | 9.94 | 13.37 | 6.56 | 1.01 |
| d28 | 4.60 | 8.48 | 5.98 | 1.67 | 4.22 |

Zoom lens unit data

| Unit | First surface | Focal length |
|---|---|---|
| 1 | 1 | 77.00 |
| 2 | 14 | −16.58 |
| 3 | 21 | −83.06 |
| 4 | 24 | 40.81 |
| 5 | 29 | 112.51 |

Numerical Embodiment 5

| | | | Unit: mm | | | |
|---|---|---|---|---|---|---|
| Surface number | r | d | nd | vd | θgF | Focal length |
| 1 | −747.20065 | 2.80000 | 1.749505 | 35.33 | 0.5818 | −142.472 |
| 2 | 125.76631 | 3.04163 | | | | |
| 3 | 121.09795 | 6.02468 | 1.959060 | 17.47 | 0.6598 | 264.861 |
| 4 | 223.06898 | 4.38288 | | | | |
| 5 | 161.14810 | 10.07838 | 1.603112 | 60.64 | 0.5415 | 216.879 |
| 6 | −692.64259 | 6.22734 | | | | |
| 7 | 156.14061 | 2.50000 | 1.846660 | 23.78 | 0.6205 | −145.489 |
| 8 | 68.72614 | 16.31807 | 1.438750 | 94.66 | 0.5340 | 151.277 |
| 9 | −1940.20499 | 9.23760 | | | | |
| 10 | 104.43028 | 7.81108 | 1.433870 | 95.10 | 0.5373 | 339.747 |
| 11 | 347.95507 | 0.20000 | | | | |
| 12 | 88.69410 | 12.35131 | 1.618000 | 63.33 | 0.5441 | 127.230 |
| 13 | −678.31970 | (Variable) | | | | |
| 14 | −220.59403 | 0.95000 | 1.729157 | 54.68 | 0.5444 | −22.667 |
| 15 | 17.98371 | 6.86337 | | | | |
| 16 | −44.24768 | 0.75000 | 1.496999 | 81.54 | 0.5375 | −57.925 |
| 17 | 83.56418 | 5.64024 | 1.854780 | 24.80 | 0.6122 | 23.601 |
| 18 | −26.08595 | 0.64937 | | | | |
| 19 | −24.20632 | 1.20000 | 1.905250 | 35.04 | 0.5848 | −27.801 |
| 20 | −555.43231 | (Variable) | | | | |
| 21 | −84.94583 | 3.38351 | 1.808095 | 22.76 | 0.6307 | 102.855 |
| 22 | −42.98470 | 1.10000 | 1.905250 | 35.04 | 0.5848 | −64.784 |
| 23 | −159.97973 | (Variable) | | | | |
| 24 | 59.28924 | 7.27257 | 1.729157 | 54.68 | 0.5444 | 48.425 |
| 25 | −83.67130 | 0.19901 | | | | |
| 26 | 97.62537 | 1.10000 | 1.854780 | 24.80 | 0.6122 | −94.834 |
| 27 | 44.28466 | 5.18910 | 1.438750 | 94.66 | 0.5340 | 112.623 |
| 28 | 402.63387 | (Variable) | | | | |
| 29 | 0.00000 | 1.96770 | | | | |
| 30 | 304.01812 | 5.92985 | 1.438750 | 94.66 | 0.5340 | 86.166 |
| 31 | −43.04074 | 1.20000 | 2.001000 | 29.14 | 0.5997 | −42.641 |
| 32 | 177227.77068 | 0.61060 | | | | |
| 33 | 192.96680 | 5.16902 | 1.761821 | 26.52 | 0.6136 | 63.091 |
| 34 | −64.01197 | 39.96462 | | | | |
| 35 | −67.90265 | 3.35345 | 1.438750 | 94.66 | 0.5340 | 208.962 |
| 36 | −39.64136 | 0.97072 | | | | |
| 37 | 51.31321 | 8.39605 | 1.808095 | 22.76 | 0.6307 | 29.095 |
| 38 | −40.97481 | 0.90000 | 1.953750 | 32.32 | 0.5905 | −21.269 |
| 39 | 41.20013 | 2.94718 | | | | |
| 40 | 55.29251 | 9.36046 | 1.531717 | 48.84 | 0.5631 | 34.007 |
| 41 | −25.46809 | 1.00000 | 2.000690 | 25.46 | 0.6133 | −24.261 |
| 42 | 659.07832 | 0.16111 | | | | |
| 43 | 66.16236 | 6.42366 | 1.620041 | 36.26 | 0.5879 | 53.988 |
| 44 | −66.09475 | 41.30000 | | | | |
| Image plane | ∞ | | | | | |

Aspherical surface data

Sixth surface

K = −4.47183e+002  A4 = −3.41573e−008  A6 = 6.95903e−011  A8 = −3.01106e−014
A10 = 8.74198e−018  A12 = −1.16539e−021

Twentieth surface

K = 1.24103e+003  A4 = −8.60519e−006  A6 = −8.07178e−009  A8 = 3.65073e−011
A10 = −3.13090e−013  A12 = 5.43073e−016

Twenty-fourth surface

K = −6.30935e−001  A4 = −2.19754e−006  A6 = 4.97043e−010  A8 = 8.18618e−013
A10 = −3.31318e−015  A12 = 3.46072e−018

Various data
Zoom ratio 10.00

| | | | | | |
|---|---|---|---|---|---|
| Focal length | 30.00 | 53.71 | 83.51 | 225.00 | 300.00 |
| F-number | 2.73 | 2.74 | 2.73 | 2.74 | 3.65 |
| Half angle of view | 26.26 | 15.41 | 10.05 | 3.76 | 2.82 |
| Image height | 14.80 | 14.80 | 14.80 | 14.80 | 14.80 |
| Total lens length | 309.35 | 309.35 | 309.35 | 309.35 | 309.35 |
| BF | 41.30 | 41.30 | 41.30 | 41.30 | 41.30 |
| d13 | 1.73 | 21.15 | 33.29 | 48.27 | 50.28 |
| d20 | 48.09 | 13.04 | 2.61 | 3.20 | 1.86 |

-continued

| Unit: mm | | | | | |
|---|---|---|---|---|---|
| d23 | 3.61 | 20.50 | 24.21 | 8.04 | 0.99 |
| d28 | 11.00 | 9.74 | 4.32 | 4.92 | 11.31 |

| Zoom lens unit data | | |
|---|---|---|
| Unit | First surface | Focal length |
| 1 | 1 | 85.81 |
| 2 | 14 | −17.42 |
| 3 | 21 | −166.06 |
| 4 | 24 | 52.06 |
| 5 | 29 | 118.97 |

Numerical Embodiment 6

| Unit: mm | | | | | |
|---|---|---|---|---|---|
| Surface number | r | d | nd | νd | θgF | Focal length |
| 1 | −197.46263 | 3.50000 | 1.673000 | 38.26 | 0.5757 | −133.870 |
| 2 | 168.79224 | 2.86612 | | | | |
| 3 | 252.80636 | 9.93371 | 1.433870 | 95.10 | 0.5373 | 283.184 |
| 4 | −237.35006 | 0.20000 | | | | |
| 5 | 246.56553 | 9.22598 | 1.433870 | 95.10 | 0.5373 | 299.033 |
| 6 | −272.16206 | 11.68863 | | | | |
| 7 | 154.71924 | 6.25632 | 1.433870 | 95.10 | 0.5373 | 454.775 |
| 8 | 701.55585 | −0.09379 | | | | |
| 9 | 149.56789 | 9.09653 | 1.433870 | 95.10 | 0.5373 | 264.106 |
| 10 | −486.12842 | 0.46813 | | | | |
| 11 | 92.97178 | 7.00797 | 1.595220 | 67.74 | 0.5442 | 223.941 |
| 12 | 296.27670 | (Variable) | | | | |
| 13 | 1907.44452 | 1.30000 | 1.953750 | 32.32 | 0.5898 | −22.657 |
| 14 | 21.51475 | 5.98948 | | | | |
| 15 | −42.14301 | 1.10000 | 1.496999 | 81.54 | 0.5375 | −38.995 |
| 16 | 36.38998 | 5.50233 | 1.854780 | 24.80 | 0.6122 | 20.826 |
| 17 | −33.01640 | 1.08048 | | | | |
| 18 | −28.21283 | 1.10000 | 1.882997 | 40.76 | 0.5667 | −33.453 |
| 19 | −569.66975 | (Variable) | | | | |
| 20 | −57.11300 | 1.30000 | 1.816000 | 46.62 | 0.5568 | −62.427 |
| 21 | 499.65237 | 2.24920 | 1.959060 | 17.47 | 0.6598 | 178.479 |
| 22 | −265.11503 | (Variable) | | | | |
| 23 | 77.28192 | 6.38615 | 1.729157 | 54.68 | 0.5444 | 48.666 |
| 24 | −63.83181 | 0.18000 | | | | |
| 25 | 134.47946 | 1.10000 | 1.854780 | 24.80 | 0.6122 | −170.085 |
| 26 | 69.91155 | 4.78607 | 1.487490 | 70.23 | 0.5300 | 115.164 |
| 27 | −283.50046 | (Variable) | | | | |
| 28 | 0.00000 | 14.12157 | | | | |
| 29 | −480.27321 | 4.22641 | 1.496999 | 81.54 | 0.5375 | 97.192 |
| 30 | −44.13583 | 1.40000 | 1.953750 | 32.32 | 0.5898 | −111.148 |
| 31 | −76.39909 | 36.99103 | | | | |
| 32 | 125.95467 | 5.44342 | 1.531717 | 48.84 | 0.5631 | 71.858 |
| 33 | −54.39829 | 1.15328 | | | | |
| 34 | 49.00772 | 7.06779 | 1.518229 | 58.90 | 0.5457 | 45.071 |
| 35 | −42.75283 | 1.20000 | 2.000690 | 25.46 | 0.6133 | −19.416 |
| 36 | 36.73612 | 1.88528 | | | | |
| 37 | 35.81354 | 4.45132 | 1.487490 | 70.23 | 0.5300 | 86.256 |
| 38 | 227.22313 | 8.02559 | | | | |

-continued

| Unit: mm | | | | | | |
|---|---|---|---|---|---|---|
| 39 | −20501.53027 | 1.20000 | 1.882997 | 40.76 | 0.5667 | −34.193 |
| 40 | 30.41464 | 7.83534 | 1.808095 | 22.76 | 0.6307 | 28.487 |
| 41 | −87.39518 | 40.00000 | | | | |
| Image plane | ∞ | | | | | |

Aspherical surface data

Twelfth surface

K = 0.00000e+000    A4 = 3.63112e−008    A6 = −5.38613e−012    A8 = 2.23842e−016
A10 = 6.02800e−020

Nineteenth surface

K = 2.91144e−001    A4 = −5.70922e−006    A6 = 2.85087e−008    A8 = −1.13749e−009
A10 = 2.01106e−011    A12 = −1.87625e−013    A14 = 8.79558e−016    A16 = −1.63214e−018

Twenty-third surface

K = 2.00155e+000    A4 = −3.18694e−006    A6 = 1.67700e−010    A8 = 9.53920e−012
A10 = −7.94125e−014    A12 = 3.34689e−016    A14 = −7.06581e−019    A16 = 5.85971e−022

Various data
Zoom ratio 12.00

| Focal length | 25.00 | 48.64 | 80.68 | 166.00 | 300.00 |
|---|---|---|---|---|---|
| F-number | 2.80 | 2.80 | 2.80 | 2.80 | 4.00 |
| Half angle of view | 30.63 | 16.92 | 10.39 | 5.09 | 2.82 |
| Image height | 14.80 | 14.80 | 14.80 | 14.80 | 14.80 |
| Total lens length | 297.20 | 297.20 | 297.20 | 297.20 | 297.20 |
| BF | 40.00 | 40.00 | 40.00 | 40.00 | 40.00 |
| d12 | 1.49 | 25.82 | 41.03 | 55.91 | 62.32 |
| d19 | 62.38 | 25.13 | 8.31 | 0.88 | 0.81 |
| d22 | 0.83 | 11.09 | 16.03 | 12.24 | 0.71 |
| d27 | 5.28 | 7.94 | 4.60 | 0.95 | 6.14 |

Zoom lens unit data

| Unit | First surface | Focal length |
|---|---|---|
| 1 | 1 | 91.29 |
| 2 | 13 | −19.35 |
| 3 | 20 | −97.17 |
| 4 | 23 | 43.15 |
| 5 | 28 | 127.68 |

Numerical Embodiment 7

| Unit: mm | | | | | | |
|---|---|---|---|---|---|---|
| Surface number | r | d | nd | vd | θgF | Focal length |
| 1 | −167.13232 | 2.80000 | 1.749505 | 35.33 | 0.5818 | −104.771 |
| 2 | 151.08605 | 1.59677 | | | | |
| 3 | 154.01861 | 5.33115 | 1.959060 | 17.47 | 0.6598 | 292.268 |
| 4 | 330.70825 | 3.62180 | | | | |
| 5 | 594.57929 | 11.14451 | 1.603112 | 60.64 | 0.5415 | 186.151 |
| 6 | −138.09196 | 8.87620 | | | | |
| 7 | 154.48815 | 2.50000 | 1.846660 | 23.78 | 0.6205 | −202.140 |
| 8 | 80.96588 | 9.29853 | 1.438750 | 94.66 | 0.5340 | 218.458 |
| 9 | 496.35864 | 6.12189 | | | | |
| 10 | 126.60002 | 10.00578 | 1.433870 | 95.10 | 0.5373 | 198.665 |
| 11 | −265.68737 | 0.20000 | | | | |
| 12 | 67.44222 | 9.48829 | 1.595220 | 67.74 | 0.5442 | 139.474 |
| 13 | 335.46222 | (Variable) | | | | |
| 14 | 155.82298 | 0.95000 | 1.755000 | 52.32 | 0.5474 | −26.352 |
| 15 | 17.66769 | 7.55810 | | | | |
| 16 | −31.69279 | 0.75000 | 1.496999 | 81.54 | 0.5375 | −44.294 |
| 17 | 73.35231 | 5.79863 | 1.800000 | 29.84 | 0.6017 | 24.055 |
| 18 | −25.43887 | (Variable) | | | | |
| 19 | −21.64494 | 1.20000 | 1.763850 | 48.49 | 0.5589 | −30.813 |
| 20 | −261.20188 | (Variable) | | | | |
| 21 | −67.68553 | 4.15111 | 1.808095 | 22.76 | 0.6307 | 72.034 |

-continued

| Unit: mm | | | | | | |
|---|---|---|---|---|---|---|
| 22 | −32.33599 | 1.10000 | 1.905250 | 35.04 | 0.5848 | −46.252 |
| 23 | −141.10373 | (Variable) | | | | |
| 24 | 76.97248 | 7.28984 | 1.639999 | 60.08 | 0.5370 | 53.400 |
| 25 | −59.61422 | 0.19065 | | | | |
| 26 | 60.58535 | 1.10000 | 1.854780 | 24.80 | 0.6122 | −120.827 |
| 27 | 37.99653 | 5.40884 | 1.487490 | 70.23 | 0.5300 | 95.859 |
| 28 | 190.98280 | (Variable) | | | | |
| 29 | 0.00000 | 2.07412 | | | | |
| 30 | −27250.41983 | 4.98126 | 1.487490 | 70.23 | 0.5300 | 100.750 |
| 31 | −49.19537 | 1.20000 | 2.001000 | 29.14 | 0.5997 | −36.979 |
| 32 | 156.42440 | 0.69270 | | | | |
| 33 | 93.12560 | 5.55019 | 1.728250 | 28.46 | 0.6077 | 61.043 |
| 34 | −84.23585 | 43.77045 | | | | |
| 35 | 73.82797 | 6.99762 | 1.438750 | 94.66 | 0.5340 | 78.962 |
| 36 | −63.68762 | 0.94954 | | | | |
| 37 | 52.06539 | 8.48906 | 1.808095 | 22.76 | 0.6307 | 32.935 |
| 38 | −51.53334 | 0.90000 | 1.953750 | 32.32 | 0.5905 | −25.027 |
| 39 | 45.46110 | 5.00249 | | | | |
| 40 | 46.47962 | 8.75574 | 1.487490 | 70.23 | 0.5300 | 40.609 |
| 41 | −32.54260 | 1.00000 | 2.001000 | 29.14 | 0.5997 | −19.968 |
| 42 | 53.73204 | 1.35581 | | | | |
| 43 | 43.57517 | 7.71665 | 1.620041 | 36.26 | 0.5879 | 46.474 |
| 44 | −80.83264 | 43.38000 | | | | |

Aspherical surface data

Sixth surface

K = −1.51267e+001   A4 = −6.49448e−007   A6 = 2.35413e−010   A8 = −9.02147e−014
A10 = 2.62134e−017   A12 = −3.74536e−021

Twentieth surface

K = 3.72020e+001   A4 = −9.83020e−006   A6 = −4.95860e−009   A8 = −2.35672e−011
A10 = 5.83243e−014   A12 = −2.06036e−016

Twenty-fourth surface

K = −1.45023e+000   A4 = −1.99598e−006   A6 = 6.26743e−010   A8 = 8.22589e−013
A10 = −4.34519e−015   A12 = 5.01150e−018

Various data
Zoom ratio 9.62

| Focal length | 25.99 | 49.13 | 77.97 | 177.00 | 250.00 |
|---|---|---|---|---|---|
| F-number | 2.74 | 2.73 | 2.74 | 2.74 | 3.67 |
| Half angle of view | 29.65 | 16.76 | 10.75 | 4.78 | 3.39 |
| Image height | 14.80 | 14.80 | 14.80 | 14.80 | 14.80 |
| Total lens length | 312.28 | 312.28 | 312.28 | 312.28 | 312.28 |
| BF | 43.38 | 43.38 | 43.38 | 43.38 | 43.38 |
| d13 | 0.99 | 21.33 | 34.05 | 48.68 | 51.85 |
| d18 | 0.94 | 0.94 | 0.96 | 0.95 | 0.90 |
| d20 | 54.15 | 17.05 | 3.80 | 2.37 | 2.01 |
| d23 | 0.91 | 14.22 | 18.48 | 8.46 | 0.97 |
| d28 | 5.99 | 9.43 | 5.69 | 2.52 | 7.25 |

Zoom lens unit data

| Unit | First surface | Focal length |
|---|---|---|
| 1 | 1 | 80.63 |
| 21 | 14 | −176.98 |
| 22 | 19 | −30.81 |
| 3 | 21 | −119.24 |
| 4 | 24 | 47.73 |
| 5 | 29 | 122.66 |

TABLE 1

| Conditional Expression | Embodiment | | | | | | |
|---|---|---|---|---|---|---|---|
| | 1 | 2 | 3 | 4 | 5 | 6 | 7 |
| (1) f1/f2 | −4.35 | −3.88 | −4.43 | −4.64 | −4.93 | −4.72 | −4.35 |
| (2) ft/f1 | 3.10 | 2.81 | 2.88 | 3.25 | 3.50 | 3.29 | 3.10 |
| (3) f3/f2 | 6.43 | 3.96 | 6.06 | 5.01 | 9.53 | 5.02 | 6.43 |
| (4) fA/fw | 1.84 | 1.96 | 2.20 | 1.57 | 1.74 | 1.73 | 1.84 |
| (5) fA/f2 | −2.57 | −2.13 | −2.91 | −2.46 | −2.99 | −2.23 | −2.57 |
| (6) fA1/fA | 1.12 | 1.00 | 0.98 | 1.21 | 0.93 | 1.13 | 1.12 |
| (7) (θ2n − θ2p)/(ν2n − ν2p) | −0.0017 | −0.0022 | −0.0017 | −0.0023 | −0.0018 | −0.0018 | −0.0017 |
| (8) f21/f2 | 1.42 | 1.16 | 1.46 | 1.41 | 1.30 | 1.17 | 1.42 |
| (9) ν3n/ν3p | 1.54 | 2.33 | 1.54 | 1.82 | 1.54 | 2.67 | 1.54 |
| fw | 26.00 | 22.00 | 26.00 | 26.00 | 30.00 | 25.00 | 26.00 |
| ft | 249.99 | 220.00 | 250.00 | 250.00 | 300.00 | 300.00 | 249.99 |
| f1 | 80.63 | 78.40 | 86.85 | 77.00 | 85.81 | 91.29 | 80.63 |
| f2 | −18.55 | −20.20 | −19.60 | −16.58 | −17.42 | −19.35 | −18.55 |
| f3 | −119.24 | −79.99 | −118.82 | −83.06 | −166.06 | −97.17 | −119.24 |
| fA | 47.73 | 43.02 | 57.07 | 40.81 | 52.06 | 43.15 | 47.73 |
| f21 | −26.35 | −23.37 | −28.63 | −23.35 | −22.67 | −22.66 | −26.35 |
| fA1 | 53.40 | 43.02 | 55.93 | 49.33 | 48.42 | 48.67 | 53.40 |
| ν2n | 60.78 | 45.22 | 60.78 | 43.98 | 57.09 | 51.54 | 60.78 |
| ν2p | 29.84 | 24.80 | 29.84 | 24.80 | 24.80 | 24.80 | 29.84 |
| θ2n | 0.55 | 0.57 | 0.55 | 0.57 | 0.56 | 0.56 | 0.55 |
| θ2p | 0.60 | 0.61 | 0.60 | 0.61 | 0.61 | 0.61 | 0.60 |
| ν3p | 22.76 | 17.47 | 22.76 | 20.36 | 22.76 | 17.47 | 22.76 |
| ν3n | 35.04 | 40.76 | 35.04 | 37.13 | 35.04 | 46.62 | 35.04 |

FIG. 15 is a schematic diagram of a main part of an image pickup apparatus using the zoom lens according to any one of Embodiments 1 to 7 as a photographing optical system. In FIG. 15, there are illustrated the zoom lens according to any one of Embodiments 1 to 7, which is denoted by 101, and a camera 124. The zoom lens 101 is configured to be detachably attachable to the camera 124. An image pickup apparatus 125 is formed by attaching the zoom lens 101 to the camera 124. The zoom lens 101 includes a front lens unit F, an intermediate lens unit consisting of one or two lens units and having a negative refractive power as a whole, which is configured to move for zooming, a first rear lens unit having a negative refractive power, which is configured to move for zooming, a second rear lens unit having a positive refractive power, which is configured to move for zooming, and a third rear lens unit having a positive refractive power, which is configured not to move for zooming. In FIG. 15, the intermediate lens unit, the first rear lens unit, and the second rear lens unit (lens units configured to move for zooming) are illustrated as a lens unit LZ, and the third rear lens unit configured not to move for zooming is illustrated as a lens unit R. The front lens unit F includes a focus sub-lens unit, which is configured to move on the optical axis for focusing.

An aperture stop SP is configured to move in the optical axis direction along the same locus as that of the second rear lens unit for zooming, or is included in the third rear lens unit and is configured not to move for zooming. Driving mechanisms 114 and 115, such as helicoids and cams, are configured to drive the focus lens unit and the lens unit LZ in the optical axis direction, respectively.

Motors (drive units) 116 to 118 are configured to electrically drive the drive mechanisms 114 and 115 and the aperture stop SP, respectively. Detectors 119 to 121, such as encoders, potentiometers, or photosensors, are configured to detect positions of the focus lens unit and the lens unit LZ on the optical axis, and the aperture diameter of the aperture stop SP, respectively. The camera 124 includes a glass block 109, which corresponds to an optical filter of the camera 124, and an image pickup element (photoelectric conversion element) 110, such as a charge coupled device (CCD) sensor or a complementary metal oxide semiconductor (CMOS) sensor, which is configured to receive an object image formed by the zoom lens 101.

Moreover, central processing units (CPUs) 111 and 122 are configured to control various kinds of driving of the camera 124 and the zoom lens 101. The zoom lens according to each Embodiment of the present invention is applied to a television camera as described above, to thereby achieve the image pickup apparatus having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-149310, filed Aug. 16, 2019, which is hereby incorporated by reference herein in its entirety.

What is claimed is:

1. A zoom lens consisting of, in order from an object side to an image side:
   a front lens unit having a positive refractive power and configured not to move for zooming;
   one or two intermediate lens units having a negative refractive power as a whole and configured to move for zooming;
   a first rear lens unit having a negative refractive power and configured to move for zooming;

a second rear lens unit having a positive refractive power and configured to move for zooming; and
a third rear lens unit having a positive refractive power and configured not to move for zooming,
wherein all intervals between adjacent lens units are changed for zooming, and
wherein following conditional expressions are satisfied:

$$-6.0 \leq f1/f2 \leq -2.5;$$

$$2.8 \leq ft/f1 \leq 5.0; \text{ and}$$

$$3.5 \leq f3/f2 \leq 12.0,$$

where f1 represents a focal length of the front lens unit, f2 represents a focal length of the one or two intermediate lens units, f3 represents a focal length of the first rear lens unit, and ft represents a focal length of the zoom lens at a telephoto end.

2. The zoom lens according to claim 1, wherein a following conditional expression is satisfied:

$$1.0 < fA/fw < 3.0,$$

where fA represents a focal length of the second rear lens unit, and fw represents a focal length of the zoom lens at a wide-angle end.

3. The zoom lens according to claim 1, wherein a following conditional expression is satisfied:

$$-4.0 < fA/f2 < -1.5,$$

where fA represents a focal length of the second rear lens unit.

4. The zoom lens according to claim 1,
wherein the second rear lens unit includes a positive lens as a lens closest to the object side, and
wherein a following conditional expression is satisfied:

$$0.7 < fA1/fA < 1.5,$$

where fA1 represents a focal length of the positive lens, and fA represents a focal length of the second rear lens unit.

5. The zoom lens according to claim 1,
wherein the one or two intermediate lens units include at least one negative lens and at least one positive lens, and
wherein a following conditional expression is satisfied:

$$-0.003 < (\theta 2n - \theta 2p)/(v2n - v2p) < -0.0015,$$

where v2p represents an average value of an Abbe number of the at least one positive lens included in the one or two intermediate lens units, θ2p represents an average value of a partial dispersion ratio of the at least one positive lens included in the one or two intermediate lens units, v2n represents an average value of an Abbe number of the at least one negative lens included in the one or two intermediate lens units, and θ2n represents an average value of a partial dispersion ratio of the at least one negative lens included in the one or two intermediate lens units.

6. The zoom lens according to claim 1,
wherein the one or two intermediate lens units include a negative lens as a lens disposed closest to the object side, and
wherein a following conditional expression is satisfied:

$$1.0 < f21/f2 < 2.0,$$

where f21 represents a focal length of the negative lens included in the one or two intermediate lens units.

7. The zoom lens according to claim 1,
wherein the first rear lens unit includes at least one negative lens and at least one positive lens, and
wherein a following conditional expression is satisfied:

$$1.5 < v3n/v3p < 3.0,$$

where v3p represents an average value of an Abbe number of the at least one positive lens included in the first rear lens unit, and v3n represents an average value of an Abbe number of the at least one negative lens included in the first rear lens unit.

8. The zoom lens according to claim 1, wherein the front lens unit includes six or more lenses including a negative lens and a positive lens.

9. The zoom lens according to claim 1, wherein the second rear lens unit includes a stop arranged closest to the object side.

10. The zoom lens according to claim 1, wherein the third rear lens unit includes a stop arranged closest to the object side.

11. An image pickup apparatus comprising:
a zoom lens consisting of, in order from an object side to an image side:
a front lens unit having a positive refractive power and configured not to move for zooming;
one or two intermediate lens units having a negative refractive power as a whole and configured to move for zooming;
a first rear lens unit having a negative refractive power and configured to move for zooming;
a second rear lens unit having a positive refractive power and configured to move for zooming; and
a third rear lens unit having a positive refractive power and configured not to move for zooming,
wherein all intervals between adjacent lens units are changed for zooming, and
wherein following conditional expressions are satisfied:

$$-6.0 \leq f1/f2 \leq -2.5;$$

$$2.8 \leq ft/f1 \leq 5.0; \text{ and}$$

$$3.5 \leq f3/f2 \leq 12.0,$$

where f1 represents a focal length of the front lens unit, f2 represents a focal length of the one or two intermediate lens units, f3 represents a focal length of the first rear lens unit, and ft represents a focal length of the zoom lens at a telephoto end; and
an image pickup element configured to pick up an image formed by the zoom lens.

* * * * *